(12) United States Patent
Hibi et al.

(10) Patent No.: US 7,256,841 B2
(45) Date of Patent: Aug. 14, 2007

(54) PROJECTION DISPLAY APPARATUS AND METHOD FOR PROJECTING IMAGE ONTO A SCREEN

(75) Inventors: Taketoshi Hibi, Tokyo (JP); Shinji Okamori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 582 days.

(21) Appl. No.: 10/771,332

(22) Filed: Feb. 5, 2004

(65) Prior Publication Data

US 2004/0169774 A1   Sep. 2, 2004

(30) Foreign Application Priority Data

Feb. 7, 2003   (JP) ............................. 2003-030425

(51) Int. Cl.
- H04N 9/12   (2006.01)
- H04N 5/74   (2006.01)

(52) U.S. Cl. ...................... 348/750; 348/743; 348/744; 348/679; 353/31

(58) Field of Classification Search ................ 348/744, 348/679, 743, 750, 758, 751; 349/5–10; 353/31, 33, 84; 359/460, 892; 345/88, 32, 345/87, 156; 352/198

See application file for complete search history.

(56) References Cited

U.S. PATENT DOCUMENTS

| | | | |
|---|---|---|---|
| 5,519,518 A * | 5/1996 | Watanabe et al. | 349/57 |
| 6,177,965 B1 * | 1/2001 | Takahara et al. | 349/5 |
| 6,345,895 B1 * | 2/2002 | Maki et al. | 353/33 |

(Continued)

FOREIGN PATENT DOCUMENTS

JP    8-21977 A    1/1996

(Continued)

OTHER PUBLICATIONS

Bierhuizen, SID Digest, "Single Panel Color Sequential Projectors with Polarization Recovery", 2002, pp. 1350-1353.

(Continued)

Primary Examiner—Victor R. Kostak
(74) Attorney, Agent, or Firm—Birch, Stewart, Kolasch & Birch, LLP

(57) ABSTRACT

A projection-type display apparatus for projecting an image onto a screen includes a light source, a signal processing unit for processing an input image signal to output a first image signal representing first primary-color information R1, G1, and B1 representing values of red, green, and blue components of an image to be projected, a signal conversion unit for converting the first image signal into a second image signal representing a coefficient M which depends on luminance of the image to be projected defined by the first primary-color information R1, G1, and B1, and into a third image signal representing second primary-color information $R2=R1/M$, $G2=G1/M$, and $B2=B1/M$. The projection-type display apparatus also includes a first light valve for modulating light received from the light source in accordance with the coefficient M, the light changing in color among red, green, and blue, a second light valve for further modulating the light received from the first light valve in accordance with the second primary-color information R2, G2, and B2 in sequence, and a projection unit for throwing the light received from the second light valve onto the screen.

16 Claims, 11 Drawing Sheets

U.S. PATENT DOCUMENTS

| | | | |
|---|---|---|---|
| 6,407,866 B1 * | 6/2002 | Yamashita et al. | 359/619 |
| 6,583,440 B2 * | 6/2003 | Yasukawa | 257/59 |
| 6,593,996 B2 * | 7/2003 | Battarel et al. | 355/44 |
| 6,618,200 B2 * | 9/2003 | Shimizu et al. | 359/619 |
| 6,626,540 B2 * | 9/2003 | Ouchi et al. | 353/31 |
| 6,831,661 B1 * | 12/2004 | Itoh et al. | 345/629 |
| 6,885,428 B2 * | 4/2005 | Hibi et al. | 352/198 |
| 6,911,963 B2 * | 6/2005 | Baba et al. | 345/88 |

FOREIGN PATENT DOCUMENTS

| | | |
|---|---|---|
| JP | 8-294138 A | 11/1996 |
| JP | 2001-100699 A | 4/2001 |
| JP | 2002-62583 A | 2/2002 |

OTHER PUBLICATIONS

Dewald et al, SID Digest, "Sequential Color Recapture and Dynamic Filtering: A method of Scrolling Color", 2001, pp. 1076-1079.

Kurita, SID Digest, "Moving Picture Quality Improvement for Hold-type AM-LCDs", 2001, pp. 986-989.

* cited by examiner

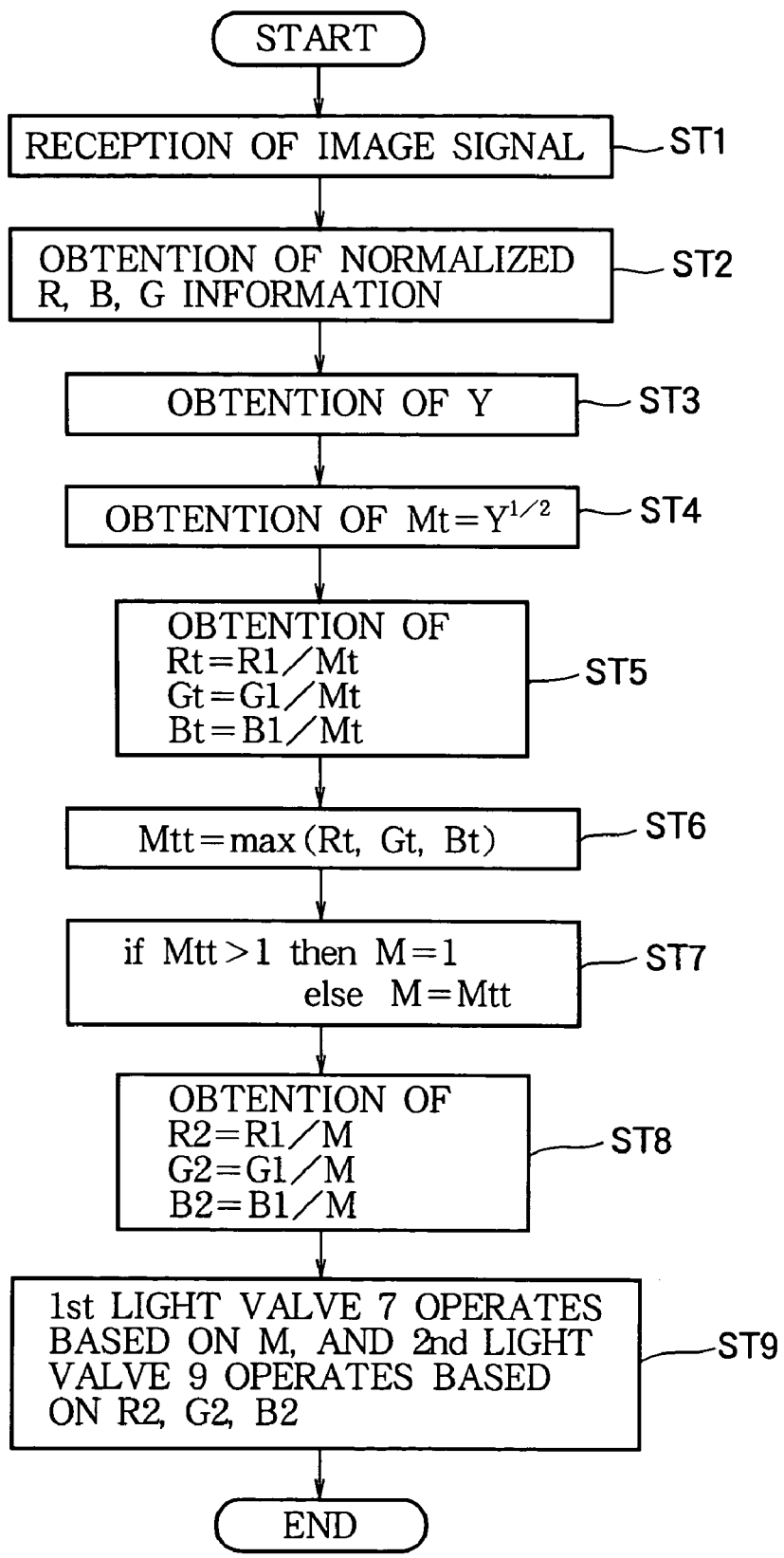

S1
(0.6, 0.8, 0.4)

S3          S2
(0.626, 0.834, 0.417) (0.959)

S1
(0.15, 0.1, 0.2)

S3          S2
(0.266, 0.177, 0.355) (0.563)

S1
(0.05, 0.05, 0.05)

S3          S2
(0.224, 0.224, 0.224) (0.224)

S1
(1, 0.05, 0.05)

S3          S2
(1, 0.05, 0.05) (1)

PROJECTION DISPLAY APPARATUS AND METHOD FOR PROJECTING IMAGE ONTO A SCREEN

BACKGROUND OF THE INVENTION

1. Field of the Invention

This Nonprovisional application claims priority under 35 U.S.C. § 119(a) on Patent Application No(s). 2003-030425 filed in JAPAN on Feb. 7, 2003, the entire contents of which are hereby incorporated by reference.

The present invention relates to a projection-type display apparatus for use in a projection television or the like, and a method of driving such a projection-type display apparatus.

2. Description of Related Art

A conventional projection-type display apparatus has, in addition to three light valves corresponding to three primary colors, an extra light valve for enhancing brightness of a projected image. The brightness of the image can be increased by adding up the lights exiting from these four light valves (for example, refer to Patent Document 1). Another conventional projection-type display apparatus has a shutter disposed across an optical path of illuminating light in order to improve contrast (for example, refer to Patent Document 2 and Patent Document 3). Another conventional projection-type display apparatus has three reflective liquid-crystal light valves for displaying images in high resolution and good contrast (for example, refer to Patent Document 4).

On the other hand, for providing low-cost projection-type display apparatuses, it is desirable that they have only one light valve. There are known several techniques for realizing such a projection-type display apparatus excellent in brightness while having only one liquid-crystal light valve (for example, refer to Non-Patent Document 1 and Non-Patent Document 2). Non-Patent Document 3 describes the image-quality problem in displaying moving pictures by use of a hold-type light valve in which image data is held until next image data is input, and a remedy to this problem.

[Patent Document 1]
Japanese Patent Application Laid-open No. 8-294138 (Pages 5-6, FIG. 1)

[Patent Document 2]
Japanese Patent Application Laid-open No. 8-21977 (Pages 3-4, FIG. 2)

[Patent Document 3]
Japanese Patent Application Laid-open No. 2001-100699 (Pages 3-4, FIG. 1)

[Patent Document 4]
Japanese Patent Application Laid-open No. 2002-62583 (Pages 4-5, FIG. 1)

[Non-Patent Document 1]
Serge Bierhuizen, Single Panel Color Sequential Projectors with Polarization Recovery, SID'02 Digest-55.5

[Non-Patent Document 2]
D. Scott Dewald, Steven M. Penn, M. Davis, Sequential Color Recapture and Dynamic Filtering: A Method of Scrolling Color, SID'01 Digest, page 1076-1079 (2001)

[Non-Patent Document 3]
T. Kurita, SID2001 Digest, 986, "Moving Picture Quality Improvement for Hold-type AM-LCDs"

The light valves for use in the projection-type display apparatus suitable for displaying images in large size are roughly classified into two types. One type uses a self-emission CRT (Cathode Ray Tube), and the other type uses a non-self-emission light valve. The latter is suitable for displaying images in high brightness and high resolution. In the projection-type display apparatus of the type using the non-self-emission light valve, its light valve is irradiated by illuminating light which is emitted from a lamp as a light source and condensed by a light condensing device. The light valve modulates the illuminating light in accordance with image signals, and outputs the modulated light to a projection device such as a projection lens. The projection device throws the modulated light onto a screen or the like.

It is desired that the light source is small in size to gain high utilization efficiency of light. For example, an ultra-high pressure mercury lamp is used for the light source. The non-self-emission light valve may be a transmissive liquid-crystal light valve, a reflective liquid-crystal light valve, or a micro mirror device. It is said that the reflective liquid-crystal light valve can have finer pixels required for high-resolution display with relative ease, since it can be manufactured by a process similar to semiconductor-manufacturing processes. Important characteristics of the projection-type display apparatus includes brightness, contrast and resolution. It is also important the projection-type display apparatus can display moving images clearly when it supports motion-picture signals such as television signals.

Contrast affects impression of image quality of a projected image greatly. In the conventional projection-type display apparatus using the light valve of the non-self-emission type, the contrast ratio between a full screen black pattern and a full screen white pattern (referred to as "full-white to full-black contrast" hereinafter) is a few hundreds to one. However, the contrast ratio between a high-brightness area and a low-brightness area in an actual image (referred to as "image contrast" hereinafter) falls short of the full-white to full-black contrast due to stray light within the display apparatus etc. Accordingly, there has been a problem that a projected image looks undesirably whitish especially in a dark movie scene. Meanwhile, the full-white to full-black contrast of the projection-type display apparatus using a CRT that emits light itself is as large as a few thousands to one. As explained above, the conventional projection-type display apparatus using the light valve of the non-self-emission type is not at a satisfactory level in image contrast.

The projection-type display apparatus with a light shutter disposed across its optical path can adjust an average brightness of a projected image by having the light shutter control intensity of the light illuminating the light valve, whereby the full-white to full-black contrast is improved. However, the image contrast itself cannot be improved by using such a light shutter.

With the projection-type display apparatus which modulates red, green, blue and white lights individually by light valves, and adds the modulated lights together, peak brightness of a projected image can be increased, however, the image contrast itself cannot be improved. Besides, when the white light is added to the red, green and white lights for enhancing brightness, color reproduction range (gamut) is narrowed, and color tone (intensity level) of an input image is not reproduced faithfully in some cases.

The projection-type display apparatus having only one light valve can be manufactured at lower cost. However, it has a problem that the utilization efficiency of light is low and brightness of a projected image is therefore low when projecting a full color image, since the full color image is projected on a field-sequential basis in which the lights of colors which are not selected in each field are discarded. It is possible to improve brightness by using a high-power lamp. However, in this case, a large lamp has to be used and a large-scaled cooling structure has to be provided. In consequence, the display apparatus becomes large in size and manufacturing cost increases contrary. In the case of using a liquid-crystal device as the light valve, there is a problem that leakage light increases, since it is necessary to pass a wide-wavelength-band light through a polarization-separation prism, which makes the image contrast low.

Most of the light valves of the non-self-emission type are hold-type light valves in which image data is held until the next image data is input. However, there is a problem that the projection-type display apparatuses which use such a hold-type light valve is inferior to the display apparatuses which use a CRT in image quality when projecting moving pictures (for example, refer to Non-Patent Document 3). Non-Patent Document 3 discloses, for overcoming this problem, having the lamp blink, or providing periods during each of which the light valve forms a full screen black pattern. However, the former involves the disadvantage that the life span of the lamp is shortened, and the latter involves the disadvantage that brightness is lowered. Accordingly, it was difficult to apply such countermeasures to the projection-type display apparatus using the hold-type light valve.

SUMMARY OF THE INVENTION

The present invention has been made to remove the above-described problems with an object of providing a projection-type display apparatus capable of displaying images in high resolution and in high contrast.

Another object of the invention is to provide a low-cost projection-type display apparatus having high utilization efficiency of light, and accordingly being capable of displaying brighter images.

Another object of the invention is to provide a projection-type display apparatus capable of reproducing halftone (intensity levels) faithful to an input image.

Still another object of the invention is to provide a projection-type display apparatus which can display moving images clearly by use of the hold-type light valve.

To achieve the above objects the present invention provides a projection-type display apparatus for projecting an image onto a screen which includes:

a light source;

a signal processing unit for processing an input image signal to output a first image signal representing first primary-color information R1, G1, and B1 representing values of red, green, and blue components of an image to be projected; and a signal conversion unit for converting the first image signal into a second image signal representing a coefficient M which depends on luminance of the image to be projected defined by the first primary-color information R1, G1, and B1, and into a third image signal representing second primary-color information R2=R1/M, G2=G1/M, and B2=B1/M.

The projection-type display apparatus further includes a first light valve for modulating light received from the light source in accordance with the coefficient M, the light changing in color among red, green, and blue in sequence, a second light valve for further modulating the light received from the first light valve in accordance with the second primary-color information R2, G2, and B2 in sequence, and a projection unit for throwing the light received from the second light valve onto the screen.

The present invention further provides a projection-type display apparatus for projecting an image onto a screen which includes:

a light source;

a signal processing unit for processing an input image signal to output a first image signal representing first primary-color information R1, G1, and B1 representing values of red, green, and blue components of an image to be projected; and a signal conversion unit for converting the first image signal into a second image signal representing a coefficient M which depends on luminance of the image to be projected defined by the first primary-color information R1, G1, and B1, and into a third image signal representing second primary-color information R2=R1/M, G2=G1/M, and B2=B1/M.

The projection-type display apparatus further includes a first light valve for modulating light received from the light source in accordance with the coefficient M, a color-separation unit for separating the light modulated by the first light valve into red, green and blue lights, three second light valves for further modulating the red, green and blue lights received from the color separation unit in accordance with the second primary-color information R2, G2, and B2 respectively, and a projection unit for throwing mixture of the red, green, and blue lights modulated by the three second light valves onto the screen.

The present invention further provides a projection-type display apparatus for projecting an image onto a screen which includes:

a light source;

a signal processing unit for processing an input image signal to produce a first image signal representing first luminance information Y1 representing luminance of an image to be projected; and a signal conversion unit for converting the first image signal into a second image signal representing a coefficient $M=Y1^{1/2+\alpha}$, $\alpha$ being a parameter variable between $-\frac{1}{2}$ and $+\frac{1}{2}$, and into a third image signal representing second luminance information $Y2=Y1^{1/2-\alpha}$.

The projection-type display apparatus further includes a first light valve for modulating light received from the light source in accordance with the coefficient M represented by the second image signal, a second light valve for further modulating the light received from the first light valve in accordance with the second luminance information Y2 represented by the third image signal, and a projection unit for throwing the light received from the second light valve onto the screen.

BRIEF DESCRIPTION OF THE DRAWINGS

In the accompanying drawings:

FIG. 2 is a flowchart for explaining the operation of the projection-type display apparatus 1;

DESCRIPTION OF THE PREFERRED EMBODIMENTS

Embodiment 1.

Figure 1:
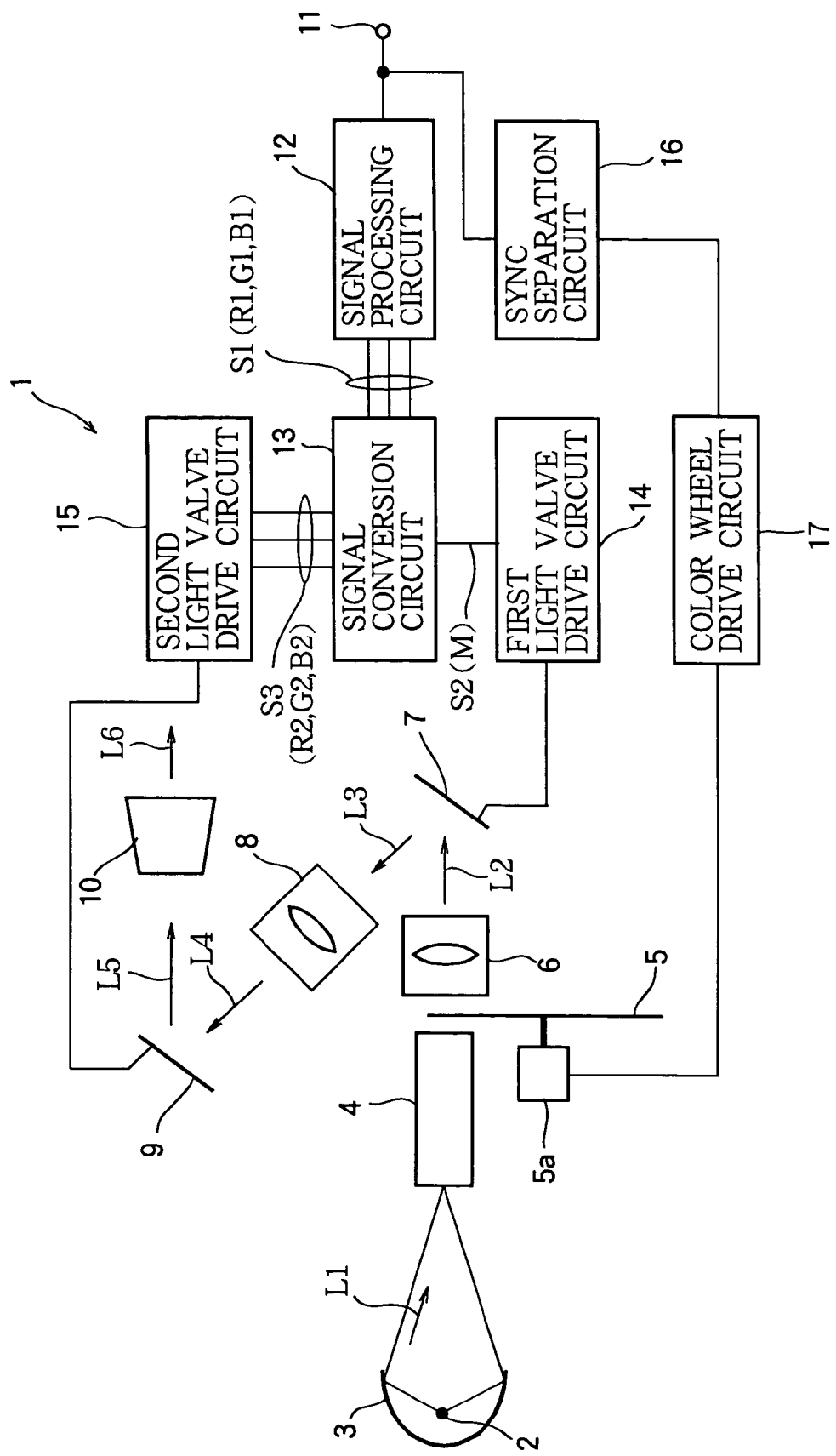
FIG. 1 shows a structure of a projection-type display apparatus 1 according to Embodiment 1 of the invention.

FIG. 1 shows a structure of a projection-type display apparatus 1 according to Embodiment 1 of the invention.

The projection-type display apparatus 1 has a lamp 2 as a light source. A lamp-side reflecting mirror 3, a columnar optical device 4, a color wheel 5, an optical relay device 6, a first light valve 7, an optical device 8, a second light valve 9, and a projection lens 10 are disposed in this order from the lamp 2 along the optical path of the light emitted by the lamp 2.

The lamp-side reflecting mirror 3 collects the light emitted from the lamp 2. The columnar optical device 4 receives the collected light and converts it into illuminating light having a rectangular cross section. The color wheel 5 receives the white illuminating light from the columnar optical device 4 and emits colored illuminating light whose color changes among three primary colors in sequence (for example, refer to Non-Patent Document 2, FIG. 2). The optical relay device 6 guides the colored illuminating light to the first light valve 7 formed by a micro mirror device. The optical device 8 reconstructs an image formed by the first light valve 7. The second light valve 9 formed by a micro mirror device. The lamp-side reflecting mirror 3, the columnar optical device 4, and the optical relay device 6 form a light guiding means.

The projection-type display apparatus 1 further includes a signal receiving section 11 for receiving an image signal such as a television signal, a signal processing circuit 12 for processing the received image signal to output a first image signal S1, a signal conversion circuit 13 for converting the first image signal S1 into a second image signal S2 and a third image signal S3, a first light valve drive circuit 14 for driving the first light valve 7 in accordance with the second image signal S2 output from the signal conversion circuit 13, a second light valve drive circuit 15 for driving the second light valve 9 in accordance with the third image signal S3 output from the signal conversion circuit 13, a sync-separation circuit 16 for separating a sync signal from the image signal entering the signal receiving section 11, and a color wheel drive circuit 17 for controlling rotation of the color wheel 5 by a motor 5*a* in accordance with the sync signal.

L1 denotes light emitted by the lamp 2 and condensed by the reflecting mirror 3, L2 denotes light illuminating the first light valve 7, L3 denotes light modulated by and output from the first light valve 7, L4 denotes light illuminating the second light valve 9, L5 denotes light modulated by and output from the first light valve 9, L6 denotes light thrown onto a screen or the like (not shown)

The operation of the projection-type display apparatus 1 having the above-described structure is explained below. The white light emitted from the lamp 2 is reflected by the lamp-side reflecting mirror 3 to make the light L1 which converges in proximity to a light-entrance surface of the columnar optical device 4. The columnar optical device 4 is a square column made of glass having a cross section which is geometrically similar to that of the light-entrance surface or image forming plane of the first light valve 7. The white light that has entered the columnar optical device 4 from its light-entrance surface is uniformalized by being reflected repeatedly while moving within the columnar optical device 4, and exits the columnar optical device 4 from its output surface as a light beam uniform in intensity. The light that has exited the columnar optical device 4 passes through the color wheel 5 to make colored light whose color changes in sequence among the primary colors. The colored light is guided by the optical relay device 6 to enter the first light valve 7 as the light L2.

The first light valve 7 modulates the light L2 to make the light L3 representing an image to be projected. The optical device 8 receives the light L3 and guides it to the second light valve 9 as the light L4. The first and second light valves are disposed in a conjugate relation so that the image formed on the light-entrance surface or the image forming plane of the first light valve 7 is reconstructed on the light-entrance surface or image forming plane of the second light valve 9. The first and the second light valves 7, 9 have a sufficient number of pixels for representing an image to be projected. The second light valve 9 further modulates the light L4 to superpose another image on the image formed by the first light valve 7, and outputs the light L5. The projection lens 10 receives the light L5 and emits the light L6 toward a screen (not shown).

The image signal or television signal in a specific format such as a composite video signal or a combination of a color difference signal and a luminance signal is input to the display apparatus through the signal receiving section 11. The signal processing circuit 12 produces the first image signal S1 representing first primary-color information R1, G1, B1 representing intensity levels of an R (red) component, a G (green) component, and a B (blue) component of the image to be projected respectively from the input image signal by use of a color decoder, a color matrix or the like, and supplies it to the signal conversion circuit 13. Here, it is assumed that each of the first primary-color information R1, G1 and B1 is normalized to be in the range of 0 to 1 and represents gradation levels without gamma correction defined in the NTSC system. The signal conversion circuit 13 converts the first image signal S1 into the second image signal S2 to be supplied to the first light valve drive circuit 14 and into the third image signal S3 to be supplied to the second light valve drive circuit 15.

The second image signal S2 carries a coefficient M depending on brightness of the image to be projected. The coefficient M is produced from the input image signal as described later. The third image signal S3 carries second primary-color information R2, G2, B2 determined by the first primary-color information R1, G1, B1 and the coefficient M. The first light valve drive circuit 14 drives the first light valve 7 based on the second image signal S2. The second light valve drive circuit 15 drives the second light valve 9 based on the third image signal S3. The coefficient M represented by the second image signal S2, and the second primary-color information R2, G2, B2 represented by the third image signal S3 are normalized in amplitude and gradation as with the first primary-color information R1, G1, B1 represented by the first image signal S1.

The first light valve 7 and the second light valve 9 have a device-specific gradation characteristic or a gamma value respectively. Accordingly, gamma collection has to be carried out in order to display the image with gradations faithful to those of an original image. Although any device for carrying out the gamma collection is not shown in FIG. 1, the gamma correction can be done by providing at least one of the signal processing circuit 12, signal conversion circuit 13, first light valve drive circuit 14, and second light valve drive circuit 15 with a specific correction table.

On the other hand, a vertical sync signal separated from the image signal by the sync-separation circuit 16 is supplied to the color wheel drive circuit 17. The color wheel drive circuit 17 drives the color wheel 5 to rotate in synchronization with the vertical sync signal. The red, green and blue lights exiting from the color wheel 5 undergo modulation depending on the coefficient M in sequence on a pixel-by-pixel basis in the first light valve 7. They further undergo modulation depending on the second primary-color information R2, G2, or B2 on a pixel-by-pixel basis in the second light valve 9 in sequence. As explained below in detail, taking the red light as an example, since the first primary-color information R1 and the second primary-color information R2 are in a relation of R1=M×R2, the first light valve 7 performs modulation using the coefficient M as a modulation factor, and the second light valve 9 performs modulation using the second primary-color information R2 (=R1/M) as a modulation factor, the projected image has a correct intensity level for its red component.

FIG. 2 is a flowchart explaining the operation of the projection-type display apparatus 1.

When the signal receiving section 11 receives an image signal in step ST1, the signal processing circuit 12 produces the first primary-color information R, G, B which are normalized, and outputs the first image signal S1 including these information in step ST2. The signal conversion circuit 13 determines brightness Y (=0.3×R+0.59×G+0.11×B) upon receiving the first image signal S1 in step ST3, and then determines a first temporary coefficient Mt (=$Y^{1/2}$) in step ST4. Next, the signal conversion circuit 13 determines temporary primary-color information Rt (=R1/Mt), Gt (=G1/Mt), Bt (=B1/Mt) in step ST5, and then determines the maximum of the temporary color information Rt, Gt, Bt to be a second temporary coefficient Mtt (=max(Rt, Gt, Bt)) in step ST6.

If the second temporary coefficient Mtt exceeds 1, the coefficient M is determined to be 1. If it does not exceed 1, the coefficient M is determined to be the value of the second temporary coefficient Mtt in step ST7. After that, the signal conversion circuit 13 determines the second primary-color information R2 (=R1/M), G2 (=G1/M), and B2 (=B1/M) in step ST8. The first light valve 7 operates based on the coefficient M, and the second light valve 9 operates based on the second primary-color information R2, G2, and B2 in step ST9.

Figure 3A:
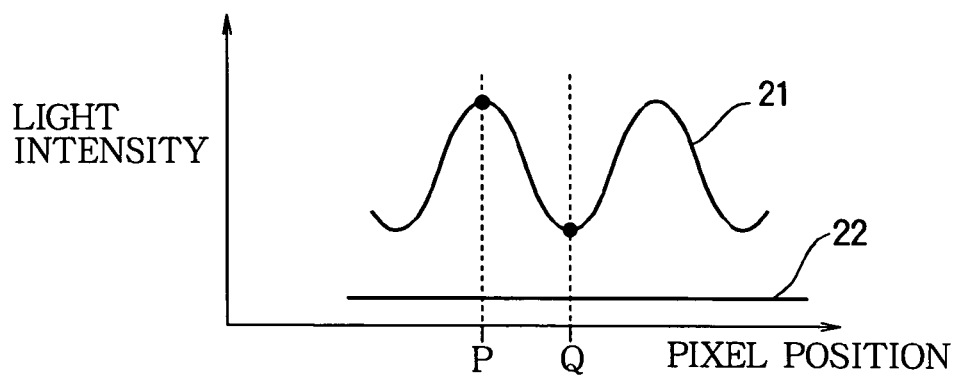
FIG. 3a shows a light-modulation characteristic of a first light valve 7 of the projection-type display apparatus 1.
Figure 3B:
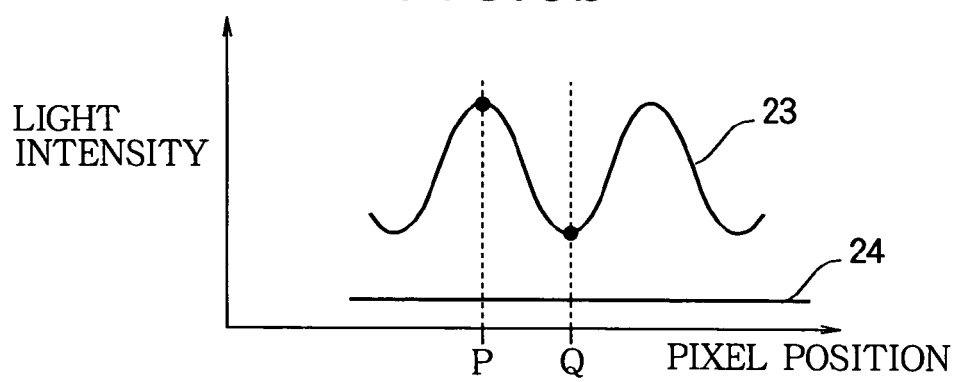
FIG. 3b shows a light modulation-characteristic of a second light valve 9 of the projection-type display apparatus 1.
Figure 3C:
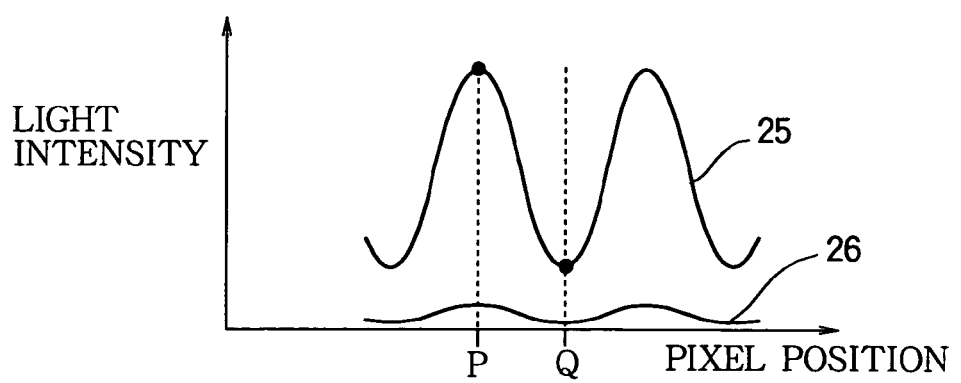
FIG. 3c shows a light-modulation characteristic of a combination of the first light valve 7 and the second light valve 9.

Light leakage in the projection-type display apparatus according to Embodiment 1 using the two light valves 7, 9 is very small. Accordingly with the display apparatus according to Embodiment 1, it is possible to display a high-contrast image. The reason for that is explained below with reference to FIGS. 3a, 3b and 3c. FIG. 3a shows a light-modulation characteristic of the first light valve 7 alone, and FIG. 3b shows a light-modulation characteristic of the second light valve 9 alone. FIG. 3c shows a light-modulation characteristic of a combination of the first light valve 7 and the second light valve 9. In each of the FIGS. 3a, 3b and 3c, the horizontal axis represents distance from a certain point in the image or positions of pixels constituting the image, and the vertical axis represents light intensity or brightness.

It is assumed that the image has a striped pattern in which light parts P and dark parts Q are alternating. In FIG. 3a, a curve 21 denotes intensity of light output from the first light valve 7 operating for displaying such an image, a straight line 22 denotes intensity of light leaking from the first light valve 7 concurrently. In FIG. 3b, a curve 23 denotes intensity of light output from the second light valve 9 operating for displaying the same image with the assumption that the first light valve 7 forms a full screen white pattern, and a straight line 24 denotes intensity of light leaking from the second light valve 9 concurrently. In FIG. 3c, a curve 25 denotes intensity of light output from the second light valve 9 that has undergone modulation by both the first light valve 7 and the second light valve 9, and a curve 26 denotes intensity of light leaking from the second light valve 9 concurrently. In each of the FIGS. 3a, 3b and 3c, leakage light is exaggerated for purposes of illustration.

The shape of the curve 25 depends on an image to be projected. The two light valves 7, 9 are driven so as to trace the curve 25 which represents luminance variation within the image, thereby faithfully reproducing the image.

The intensity of leakage light 22 of the first light valve 7 and the intensity of leakage light 24 of the second light valve 9 depend on optical characteristics of the light valve itself and optical characteristics of a prism (not shown), lenses (not shown), etc. disposed around the light valve. Generally, the intensity of leakage light of a light valve is several hundred times lower than that of image light output from the light valve. The ratio of the largest of the values which the curve 21 can take to the value of the straight line 22 defines a contrast ratio of the first light valve 7, which is about 500:1. The first light valve 7 and the second light valve 9 are disposed so as to be in a conjugate relation. Accordingly, a light beam exiting from the position Q (or pixel Q) of the image at the first light valve 7 hits the position Q (or pixel Q) of the image at the second light valve 9. So, the effect of the modulation by the first light valve 7 is multiplied by the effect of the modulation by the second light valve 9.

In consequence, the intensity of the leakage light 26 is very small for a part where the light beam exiting from the first light valve 7 and hitting the second light valve 9 is weak. For example, if the value of the curve 21 at its valley Q is one-hundredth of that at its peak P, the value of the curve 26 at its valley Q is one-hundredth of one-hundredth of that at its peak P. Accordingly, a high-contrast image can be obtained.

Figure 4A:
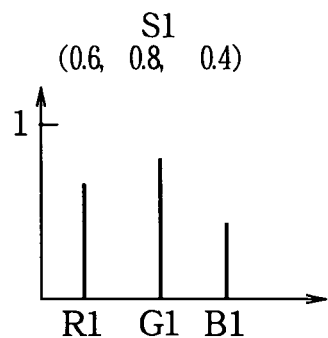
FIGS. 4a to 4h are graphs showing examples of numerical values of a first image signal S1 input to the projection-type display apparatus 1 and those of second and third image signals S2, S3 produced by a signal conversion circuit 13 of the projection-type display apparatus 1.
Figure 4B:
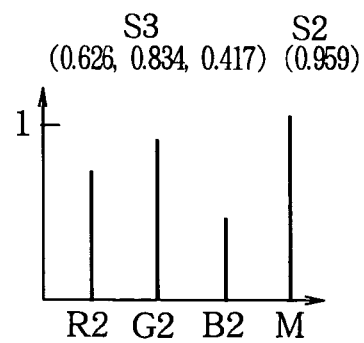

FIGS. 4a to 4h are graphs showing examples of numerical values of the first image signal S1 input through the signal receiving section 11 and those of the second and third image signals S2, S3 output from the signal conversion circuit 13. The graph of FIG. 4a shows the values of the first primary-color information R1, G1, B1 included in the first image signal S1. The graph of FIG. 4b shows the values of the second primary-color information R2, G2, B2 included in the third image signal S3 and the coefficient M included in the third image signal S3 which the signal conversion circuit 13 produces from the first image signal S1. As shown in FIGS. 4a and 4b, the signal conversion circuit 13 converts the color components (R, G, B) from (0.6, 0.8, 0.4) to (0.626, 0.834, 0.417) and sets the coefficient M to 0.959.

The first light valve 7 modulates the light L2 using the coefficient M as a modulation factor. In this case, the light modulated by the first light valve 7 and moving toward the second light valve 9 has an intensity which is nearly at its maximum level since the modulation factor M is 0.959 and is close to 1. When the colored light exiting from the color wheel 5 is red, the second light valve 9 modulates the red light using the second primary-color information R2 having the value of 0.62 as a modulation factor, whereby red light having an intensity of 0.959×0.626=0.6 is thrown onto the screen. Thus, the projected image has a red component whose value is exactly the same as that of the original image. The above explanation goes for the green and blue components.

Figure 4C:
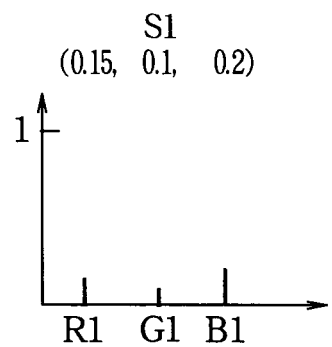
Figure 4D:
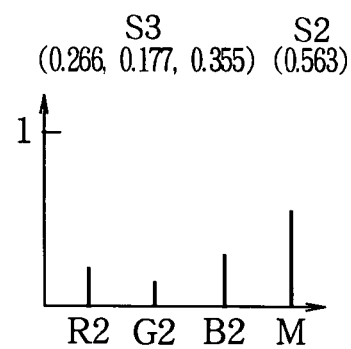

FIG. 4c shows a case where the original image is rather dark and its original color components (R, G, B) is (0.15, 0.1, 0.2), and FIG. 4d shows the color components and the coefficient M produced by the signal conversion circuit 13 in this case which are (0.266, 0.177, 0.355) and 0.563 respectively.

Figure 4E:
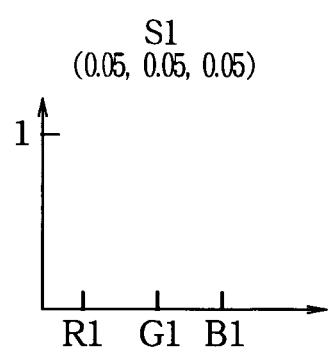
Figure 4F:
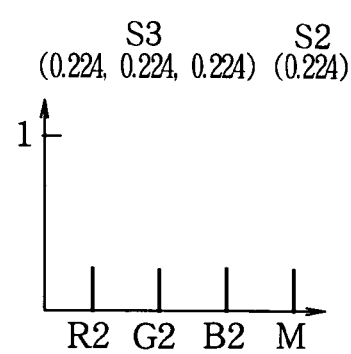
Figure 4G:
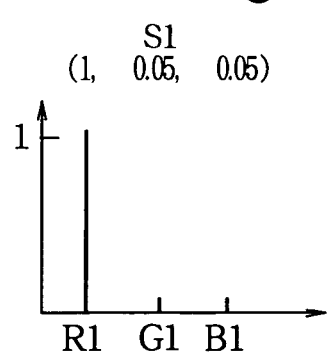
Figure 4H:
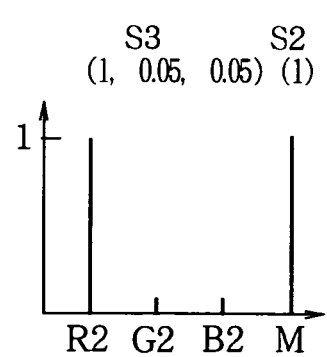

FIG. 4e shows a case where the original image is very dark and its original color components (R, G, B) is (0.05, 0.05, 0.05), and FIG. 4f shows the color components and the coefficient M produced by the signal conversion circuit 13 in this case which are (0.224, 0.224, 0.224) and 0.224 respectively. FIG. 4(g) shows a case where the original image has color components (1, 0.05, 0.05) exhibiting high degree of color saturation, and FIG. 4h shows the color components and the coefficient M produced by the signal conversion circuit 13 in this case which are (1, 0.05, 0.05) and 1 respectively. In each of the cases shown in FIGS. 4c to 4h, it is possible to reproduce the color tone of the original image faithfully as with the case shown in FIGS. 4a and 4b by performing the signal conversion and modulation processes described above.

When projecting an image, leakage light is conspicuous in a dark part of the image, and the image is often perceived to have low contrast in this part. In the case of FIGS. 4a and 4b where the image is very dark, the leakage light is reduced by 0.244 times since the coefficient M is 0.244. In the case of FIGS. 4e and 4f where the image has high degree of color-saturation, the first light valve 7 transfers high-intensity light to the second light valve 9 since the coefficient M is large in this case.

In each of the cases of FIGS. 4a to 4h, the values of the color components represented by the second and third image signals S2, S3 are equal to or larger than those represented by the first image signal S1. Accordingly, the frequency of the first and second light valves 7, 9 operating with low degree of modulation, which is susceptible to the leakage light and unfavorable for image contrast, is small.

The structure of the projection-type display apparatus of the present invention is not limited to that of Embodiment 1. Although the color wheel 5 is disposed in front of the first light valve 7 in Embodiment 1, it may be disposed between the first light valve 7 and the second light valve 9. The coefficient M and the second primary-color information R2, G2, B2 can be interchanged with each other. That is, it is possible that the second light valve 7 operates in accordance with the coefficient M, and the first light valve 7 operates in accordance with the second primary-color information R2, G2, B2. The color segment of the color wheel 5 as a colored-light producing means may take any shape as far as primary-color lights having desired wavelengths can be produced efficiently. For example, the color segment may be sectoral or spiral. Furthermore, the colored-light producing means is not limited to the color wheel.

Although the first light valve 7, the optical device 8, and the second light valve 9 are disposed in a line in Embodiment1, they may be disposed differently. For example, if the optical device 8 is not a transmissive device but a reflective device, it is possible that the optical path of the light L3 bends at the right angle. In this case, it becomes possible to reduce the size of the projection-type display apparatus by disposing the first and second light valves 7, 9 close to each other.

One or both of the first and second light valves 7, 9 may not be a micro mirror device. A reflective liquid-crystal light valve, a transmissive liquid-crystal light valve or a GLV (Grating Light Valve) can be used as the first light valve 7 and the second light valve 9 when it is necessary to meet requirements of resolution or leakage light.

As described above, in the projection-type display apparatus 1 according to Embodiment 1, the frequency of the first and second light valves 7, 9 operating with low degree of modulation, which is susceptible to the leakage light and unfavorable for image contrast, is small, since the values of the color components represented by the second and third image signals S2, S3 are equal to or larger than those represented by the first image signal S1. Accordingly, the projection-type display apparatus 1 according to Embodiment 1 surpasses others having two light valves in image contrast.

Embodiment 2.

Figure 5A:
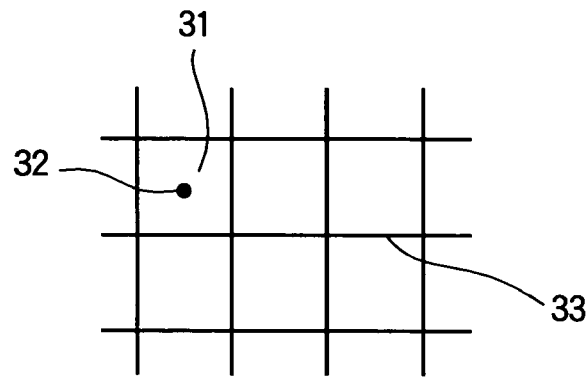
FIGS. 5*a* to 5*c* shows shapes of pixels of the first and second light valves 7, 9.
Figure 5B:
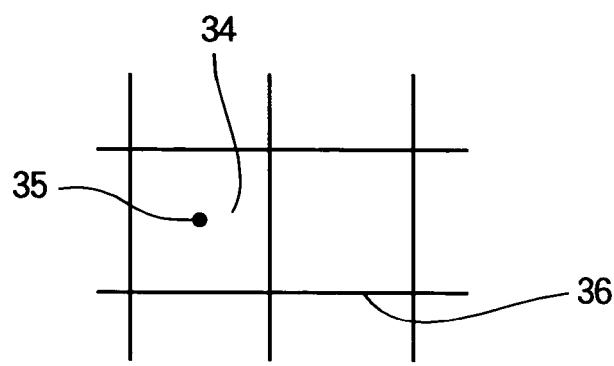
Figure 5C:
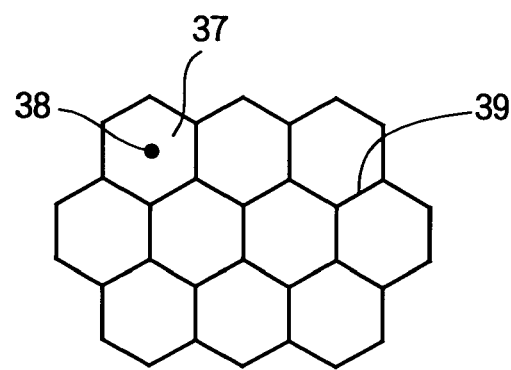

FIGS. 5a to 5c show shapes of pixels (cells) in the projection-type display apparatus 1 shown in FIG. 1.

FIG. 5a shows a shape of the pixels of the second light valve 9, FIG. 5b shows a shape of the pixels of the first light valve 7. In FIG. 5a, 31 denotes a pixel of the second light valve 9, 32 denotes a center of the pixel 31, and 33 denotes an inter-pixel gap where light is not modulated. In FIG. 5b, 34 denotes a pixel of the first light valve 7, 35 denotes a center of the pixel 34, and 36 denotes an inter-pixel gap where light is not modulated.

As shown in FIGS. 5a, 5b, the first and second light valves 7, 9 have pixels of the same square shape. However, the pixel density of the second light valve 9 is 1.5 times that of the first light valve 7. Accordingly, the ratio of the numbers of the pixels in the horizontal and vertical directions of the second light valve 9 to those of the first light valve 7 is 1.5:1. If the numbers of the pixels of the first and the second light valves are the same with each other, a pattern of an image and the inter-pixel gaps 33, 36 cause moire in some cases, thereby degrading image quality when the MTF (Modulation Transfer Function) of the projection lens 10 and resolution of a screen used (not shown) are high.

It is possible to suppress moire by differentiating the first and second light valves in pixel size. It is desirable that the ratio of the number of the pixels of the first light valve 7 to that of the second light valve 9 is between 1:1.3 and 1:1.7 to suppress moire. To take an example of definite numeric values, if the numbers of the pixels in the horizontal and vertical directions of the first light valve 7 are 1280 and 720 respectively, and those of the second light valve 9 are 1920 and 1080 respectively, moire can be suppressed, since the ratio of the pixel number of the first light valve to that of the second light valve 9 is 1:1.5 in both of the horizontal and vertical directions.

When the first and second light valves have different pixel numbers, the centers of the pixels of the second light valve 9 and the centers of the pixels of the first light valve 7 are not in a one-to-one correspondence. For example, the position of the center 32 of the pixel 31 of the second light valve 9 shown in FIG. 5a does not coincide with the position of the center 35 of the pixel 34 of the first light valve 7 shown in FIG. 5b. Accordingly, it is necessary to produce drive signals which are in a one-to-one correspondence with the pixel centers for each of the first and second light valves. Such drive signals can be produced by having an input image signal pass a two-dimensional filter to undergo interpolation or extrapolation. Spatial frequency which the first light valve 7 can reproduce is lower than that which the second light valve 9 can produce in both of the horizontal and vertical directions, since the pixel 34 of the first light valve 7 is larger in size than the pixel 31 of the second light valve 9. Accordingly, it is necessary to enhance high-spatial-frequency components of the drive signals in driving the second light valve 9.

In this embodiment, the second light valve 9 having more pixels is disposed close to the projection lens 10 so that the image light to be thrown onto the screen can enter the projection lens 10 immediately, whereby the image can be displayed with less degradation. Since the first light valve 7 may have a smaller number of larger pixels, a light valve low in price can be used as the first light valve 7. For example, if the number of pixels in horizontal and vertical directions in the first light valve 7 is 1/1.5 times that in the second light valve 9, and accordingly the total number of the pixels of the first light valve 7 is $(1/1.5)^2=0.44$ times that of the second light valve 9, the costs of the first light valve 7 and the first light valve drive circuit 14 can be reduced.

Although suppressing moire can be achieved by differentiating the first and second light valves in pixel number as described above, it can be achieved also by differentiating the first and second light valves in the shape of pixels. For example, the pixels of the second light valve 9 may have the shape shown in FIG. 5c. In FIG. 5c, 37 denotes a pixel of the second light valve 9, 38 denotes a center of the pixel 37, and 39 denotes an inter-pixel gap where light is not modulated. The pixels shown in FIGS. 5a and 5b are square, while the pixels shown in FIG. 5c are hexagonal. Since the inter-pixel gap 39 of the second light valve 9 is not parallel to the inter-pixel gap 36 of the first light valve 7, moire is hard to occur. The interval between centers of adjacent pixels and the total number of pixels of the second light valve 9 when it has the pixels shown in FIG. 5a are the same as those when it has the pixels shown in FIG. 5c. However, the total number of pixels of the second light valve 9 when it has the pixels shown in FIG. 5c may be reduced. For example, the second light valve 9 may be a light valve which has hexagonal 1280×720 (horizontal×vertical) pixels. In this case, moire can be suppressed more reliably.

In a case where two light valves having different leakage-light levels, different optical characteristics and different resolutions are used as the first light valve 7 and the second light valve 9, it is desirable that the light valve superior to the other in characteristics of interest contributes to projection of an image more than the other. If the first temporary coefficient Mt is determined by the equation of $Mt=Y^{1/2+\alpha}$ instead of $Mt=Y^{1/2}$ in step ST4 shown in FIG. 2 where $\alpha$ is a parameter ($-\frac{1}{2}<\alpha<+\frac{1}{2}$), it becomes possible to adjust importance of the first temporary coefficient Mt and importance of the coefficient M resulting from the first coefficient Mt. For example, if the parameter $\alpha$ is set to +0.1, the importance of the coefficient M is increased, whereby the contributing ratio of the first light valve 7 using the coefficient M as a modulation factor is increased.

As explained above, with Embodiment 2 of the invention, it is possible to suppress moire in a projected image and prevent degradation of image quality.

Embodiment 3.

Figure 6:
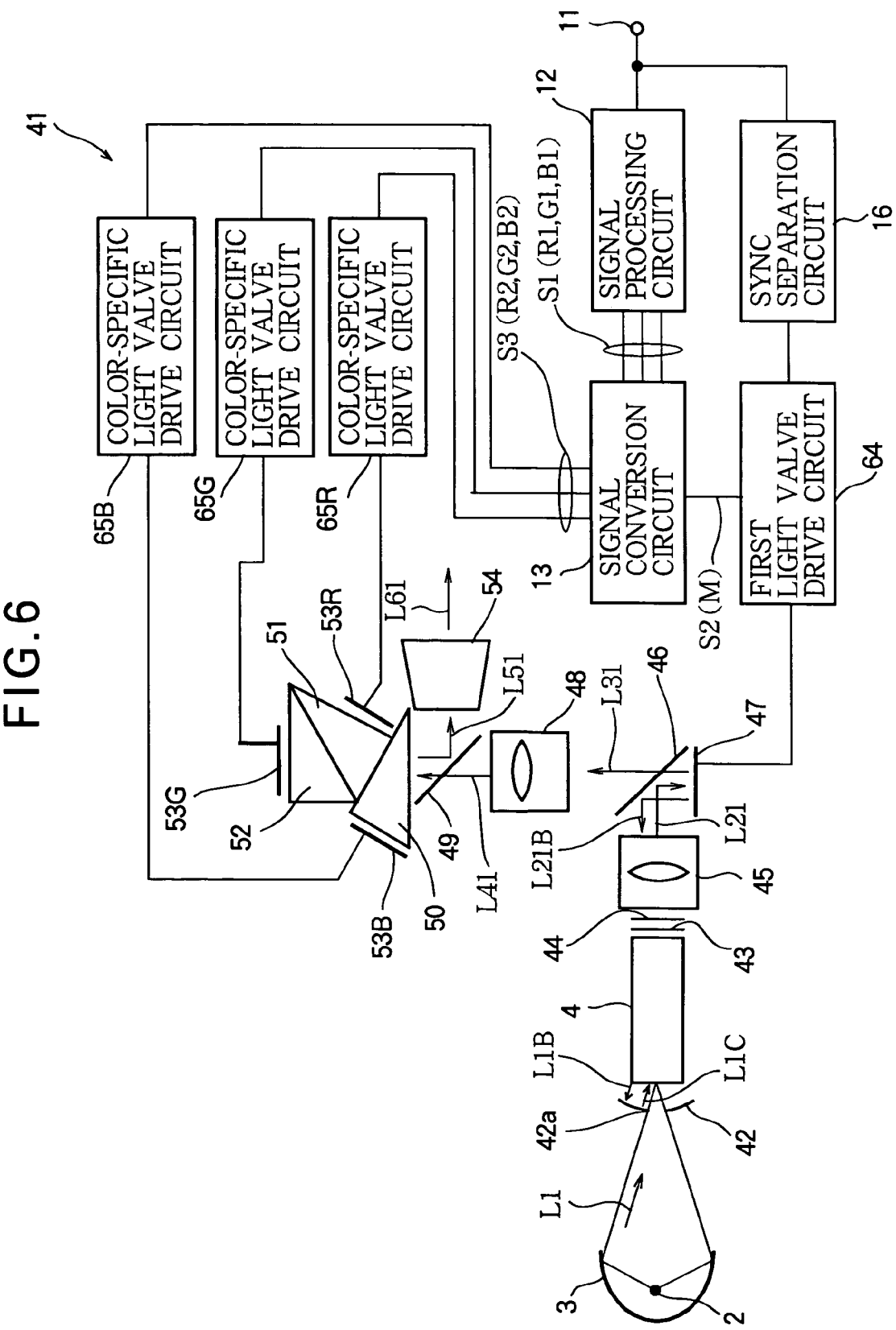
FIG. 6 shows a structure of a projection-type display apparatus 41 according to Embodiment 3 of the invention.

FIG. 6 shows a structure of a projection-type display apparatus 41 according to Embodiment 3 of the invention.

The projection-type display apparatus 41 has a lamp 2 as a light source. A lamp-side reflecting mirror 3, a reflecting mirror 42, a columnar optical device 4, a quarter wave plate 43, a reflective polarization-separation device 44, an optical relay device 45, a polarization-separation device 46, a first light valve 47, an optical device 48, a polarization-separation device 49, color-separating/mixing prisms 50, 51, 52, color-specific light valves 53R, 53G, 53B, and a projection lens 54 are disposed in this order from the lamp 2 along the optical path of the light emitted by the lamp 2.

The lamp-side reflecting mirror 3 collects light emitted from the lamp 2. The reflecting mirror 42 reflects the light back to the lamp 2. The columnar optical device 4 receives the collected light and converts it into illuminating light having a rectangular cross section. The color-specific light valves 53R, 53G, 53B modulates red light, green light, and blue light respectively. The quarter wave plate 43 and the reflective polarization-separation device 44 form a light guiding means, and also form a light recycling means together with the reflecting mirror 42.

The projection-type display apparatus 41 further includes a signal receiving section 11 for receiving an image signal such as a television signal, a signal processing circuit 12 for processing the received image signal to output the first image signal S1, a signal conversion circuit 13 for converting the first image signal S1 into the second image signal S2 and the third image signal S3, a first light valve drive circuit 64 for driving the first light valve 47 based on the second image signal S2, color-specific light valve drive circuits 65R, 65G, 65B for driving the color-specific light valves 53R, 53G, 53B based on the third image signal S3, and a sync-separation circuit 16 for separating a sync signal from the image signal and supplies it to the first light valve drive circuit 64.

In FIG. 6, L1B denotes light moving opposite in direction to the travel of the light L1, L1C denotes light which is reflection of the light L1B, L21 denotes light illuminating the first light valve 47, L21B denotes light moving opposite in direction to the travel of the light L21, L31 denotes light reflected from pixels in ON state of the first light valve 47, L41 denotes light entering the color-separating/mixing prisms 50, L51 denotes light reflected from pixels in ON state of the color-specific light valves 53R, 53G, 53B, and L61 denotes image light thrown onto a screen (not shown). The structural elements shown in FIG. 6 that are the sama as those shown in FIG. 1 are given the same reference characters, and explanation thereof will be omitted.

The operation of the projection-type display apparatus 41 having the above described structure is explained below.

The reflecting mirror 42 is placed in the vicinity of a light-entrance surface of the columnar optical device 4 for reflecting the light moving toward the lamp 2. The reflecting mirror 42 is a concave mirror having a small window 42a formed in its center allowing the light L1 to move toward the light-entrance surface of the columnar optical device 4. The reflecting mirror 42 may be a mirror joined to the light-entrance surface of the columnar optical device 4 (for example, refer to FIG. 9 of the Non Patent Document). The light illuminating the first light valve 47 which is a reflective liquid-crystal light valve has to be unidirectionally polarized light. Accordingly, the quarter wave plate 43 as a phase plate and the reflective polarization-separation device 44 are disposed in close vicinity to the light-output surface of the columnar optical device 4 and perpendicularly to the optical path.

The quarter wave plate 43 makes a phase difference by a quarter of wavelength between a component of the light passing through the quarter wave plate 43, the component vibrating in the direction parallel to the optical axis of the quarter wave plate 43 and the other component vibrating in the direction perpendicular to the optical axis. Accordingly, if the light linearly polarized to have polarization direction that forms an angle of 45 degrees with the optical axis of the quarter wave plate 43 passes through the quarter wave plate 43 twice, the polarization direction of this linearly polarized light shifts by 90 degrees. The quarter wave plate 43 and the reflective polarization-separation device 44 are disposed such that the optical axis of the quarter wave plate 43 and a polarization direction of the light passing through the reflective polarization-separation device 44 forms an angle of 45 degrees. Accordingly, the light reflected by the polarization-separation device 44 is converted to the light that can pass through the polarization-separation device 44 as explained below.

The light that has been reflected by the reflective polarization-separation device 44 moves in the reverse direction to pass through the quarter wave plate 43 and the columnar optical device 4, and exits from the light-entrance surface of the columnar optical device 4 to be reflected by the reflecting mirror 42. Then it moves in the forward direction to pass through the columnar optical device 4 and the quarter wave plate 43 again, and reaches the reflective polarization-separation device 44. This time, it pass through the reflective polarization-separation device 44, since it has passed through the quarter wave plate 43 twice after being reflected by the reflective polarization-separation device 44 and its polarization direction has been shifted by 90 degrees.

The unidirectional polarization light thus obtained is guided by the optical relay device 45 to become the illuminating light L21. The polarization-separation device 46 changes direction of the illuminating light L21 to illuminate the first light valve 47. The first light valve 47, which is a reflective liquid-crystal device driven by the first light valve drive circuit 64 based on the coefficient M, reflects the illuminating light L21 while shifting the polarization direction of the illuminating light L21 on a pixel-by-pixel basis. The pixels in ON state produce the light L31 that passes through the polarization-separation device 46, and the pixels in OFF state produce the light L21B that is reflected by the polarization-separation device 46 to move back to the lamp 2. The light L31 is condensed by the optical device 48, passes through the polarization-separation device 49 as the illuminating light L41, and enters the color-separating/mixing prism 50, 51, 52 to be separated into red, green, and blue lights. The red light goes to the color-specific light valve 53R, the green light goes to the color-specific light valve 53G, and the blue light goes to the color-specific light valve 53G.

The color-specific light valves 53R, 53G, 53B are driven by the color-specific light valve drive circuits 65R, 65G, 65B based on the second primary-color information R2, G2, B2. Red, green and blue lights reflected from the color-specific light valves 53R, 53G, 53B are mixed into the light L51 by the color-separating/mixing prism 50, 51, 52. The light L51 changes direction at the polarization-separation device 49, and goes into the projection lens 54 to be thrown onto a screen (not shown) as the image light L61.

Generally, when illuminating light passes through a light valve, there occur losses of light even if the light valve is in ON state. Accordingly, when two light valves are used, there occur more losses of light. In this embodiment, the light L21B which has not undergone the modulation (or shift of polarization direction) in the first light valve 47 and moves toward the lamp 2 is recaptured mainly by the reflecting mirror 42 as the illuminating light L21 through a process described below, thereby keeping brightness of the projected image at high level.

The light L21B reflected from the first light valve 47 is linearly polarized light having the same polarization direction as the light L21. Accordingly the light L21B moves toward the lamp 2 in the reverse direction along the optical path, enters the columnar optical device 4 from its light-output surface, and exits the columnar optical device 4 from its light-entrance surface as the light L1B. Most of the light L1B is reflected by the reflecting mirror 42 to make the light L1C that enters the columnar optical device 4 from its light-entrance surface. Some of the light L1B passes through the small window 42a formed in the center of the reflecting mirror 42, and reflects off the lamp-side reflecting mirror 3. It is mostly absorbed or diffused by an electrode (not shown) of the lamp 2, however, part of it moves past the lamp 2 and reflects off the lamp-side reflecting mirror 3 to become the light L1 afresh.

Figure 7A:
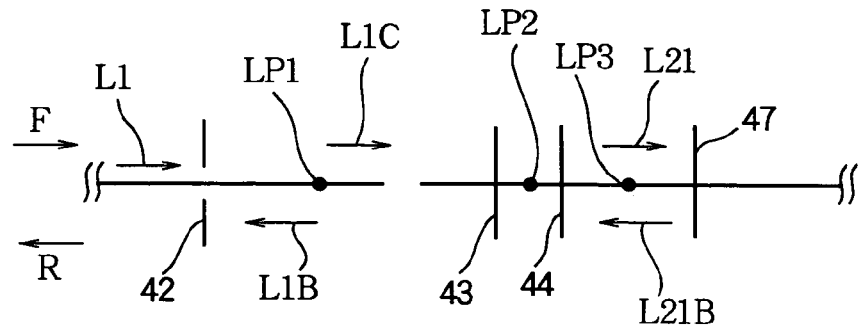
FIGS. 7*a* to 7*c* are explanatory views for explaining how polarization states of the light moving in the forward direction and the light moving in the reverse direction change between a reflecting mirror 42 and a first light valve 47 within the projection-type display apparatus 41.
Figure 7B:
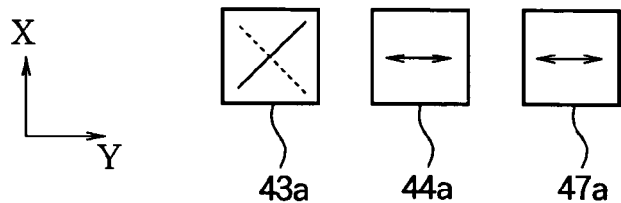
Figure 7C:
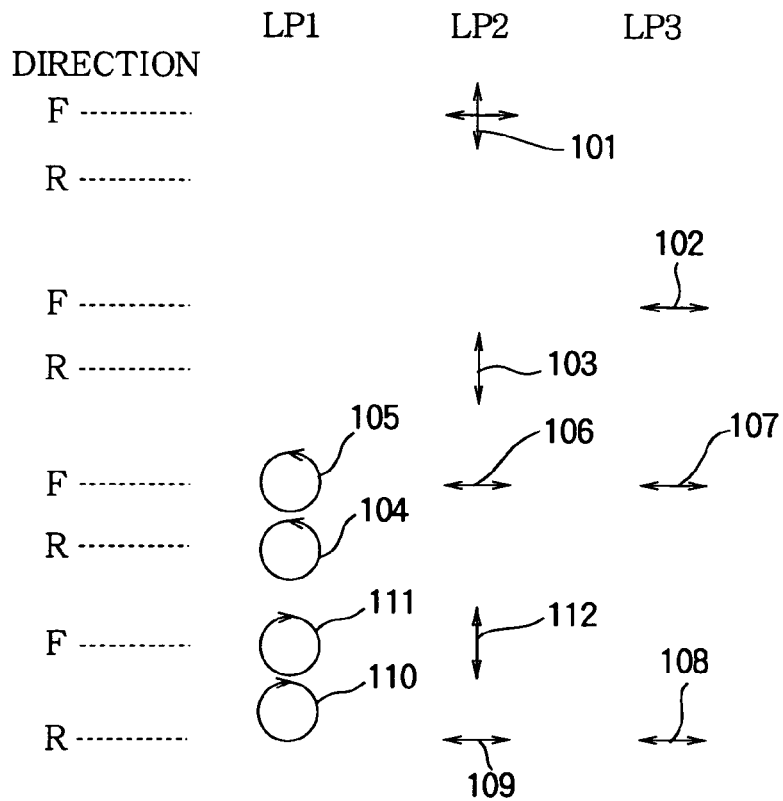

FIGS. 7a to 7c are explanatory views for explaining how polarization states of the light moving in the forward direction and the light moving in the reverse direction change between the reflecting mirror 42 and the first light valve 47.

In FIG. 7a, LP1, LP2, LP3 denote reference points in the optical path, an arrow F denotes the forward direction, and an arrow R denotes the reverse direction.

FIG. 7b shows polarization directions of the lights moving in the forward and reverse direction on the plane perpendicular to the optical path at each of the quarter wave plate 43, reflective polarization-separation device 44 and the first light valve 47. In FIG. 7b. a broken line and a solid line in a square 43a representing a cross section of the quarter wave plate 43 denote a phase-advancing axis and a phase-delaying axis respectively. An arrow in a square 44a representing a cross section of the reflective polarization-separation device 44 denotes a polarization direction of the light passing through the reflective polarization-separation device 44. An arrow in a square 47a representing the image forming plane of the first light valve 47 denotes a polarization direction of the illuminating light L21 entering the first light valve 47.

FIG. 7c shows polarization states of the lights moving in the forward direction and the reverse direction at the reference points LP1, LP2, LP3. For example, arrows 101 on the plane perpendicular to the optical path show polarization directions of the light L1 which was emitted from the lamp 2 and has reached the reference point LP2 for the first time. The light emitted from the lamp 2 or the light L1 is an aggregation of an infinite number of linearly-polarized lights having different polarization directions. When an infinite number of linearly polarized lights having different polarization directions enter the quarter wave plate 43, it can be thought that the quarter wave plate 43 transmits them as they are. Accordingly, the light L1 can be thought of as having a vertical component and a horizontal component as shown by the arrows 101.

The reflective polarization-separation device 44 passes linearly polarized light having the polarization direction shown by the arrow 102, and reflects linearly polarized light having the polarization direction shown by the arrow 103. The linearly polarized light having the polarization direction shown by the arrow 103 moves in the reverse direction and enters the quarter wave plate 43 to become the light L1B which is left-hand circularly polarized light whose polarization direction shifts counterclockwise as shown by an arrow 104 when viewed along the direction of movement thereof. The light L1B is reflected by the reflecting mirror 42 to become the light L1C which is left-hand circularly polarized light whose polarization direction shifts counterclockwise as shown by an arrow 105 when viewed along the direction of movement thereof. The light L1C passes through the quarter wave plate 43 to become linearly polarized light having a polarization direction shown by an arrow 106, passes through the reflective polarization-separation device 44, and is added to the light L21 having a polarization direction shown by an arrow 107 for illuminating the first light valve 47.

Part of the linearly polarized light L21 that has not undergone the modulation or shift in polarization direction by the first light valve 47 becomes the linearly polarized light L21B which has a polarization direction shown by an arrow 108 and moves in the reverse direction. The linearly polarized light L21B passes through the reflective polarization-separation device 44 to become the light having the polarization direction shown by an arrow 109, and passes through the quarter wave plate 43 to become right-hand circularly polarized light L1B which has a polarization direction shifting clockwise as shown by an arrow 110 when viewed along the direction of movement thereof. The right-hand circularly polarized light L1B is reflected by the reflecting mirror 42, and becomes right-hand circularly polarized light L1C whose polarization direction shifts clockwise as shown by an arrow 111 when viewed along the direction of movement thereof. The right-hand circularly polarized light L1C passes thorough the quarter wave plate 43, becomes linearly polarized light having a polarization direction shown by an arrow 112, and is reflected by the reflective polarization-separation device 43. After that, through a process similar to the process explained above for the linearly polarized light having the polarization direction shown by the arrow 103, it is added the illuminating light L21.

As described above, the reflecting mirror 42 has the function of recapturing the lights reflected by the reflective polarization-separation device 44 and the first light valve 47 for recycling them as the illuminating light.

The first light valve drive circuit 64 receives the coefficient M represented by the second image signal S2 output from the signal conversion circuit 13 and the vertical sync signal output from the sync-separation circuit 16, and drives the first light valve 47 to perform light modulation based on the coefficient M in synchronization with the vertical sync signal as described below with reference to FIGS. 8a to 8d.

Figure 8A:
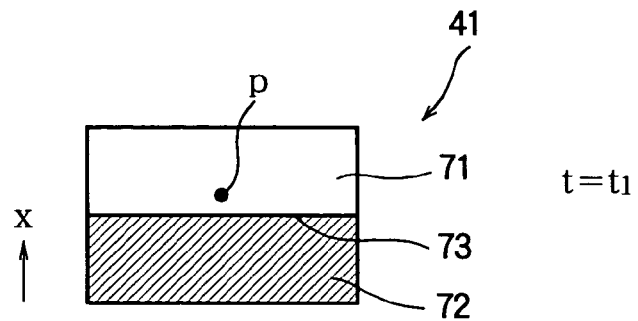
FIG. 8*a* shows the light-entrance surface or image forming plane of the first light valve 47.
Figure 8B:
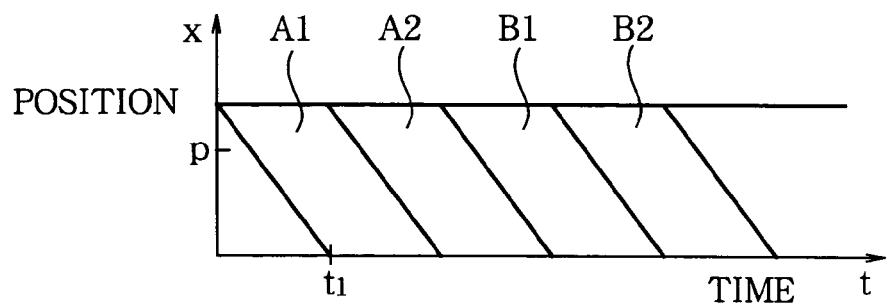
FIG. 8*b* shows timings A1, A2, B1, B2 in each of which an image is formed on the image forming plane of the first light valve 47.

FIG. 8a shows the light-entrance surface or image forming plane of the first light valve 47. In FIG. 8a, P denotes one pixel on the image forming plane, 71 denotes an area where incoming light is modulated in accordance with the coefficient M, 72 denotes an area where the incoming light is not modulated, and 73 denotes a boundary between the area 71 and the area 72. The boundary 73 moves from the top end to the bottom end of the image forming plane twice during one vertical sync period, so that the first light valve 47 forms the same image twice during one vertical sync period. In FIG. 8b, the horizontal axis represents time, and the vertical axis represents distance from the bottom end of the image forming plane or vertical pixel position of the first light valve 47. A1 and A2 represent timings in which an image A is formed, and B1 and B2 represent timings in which an image B is formed. The image A and the image B may be a field or a frame of video signals. The color-specific light valve drive circuits 65R, 65G, 65B send drive signals corresponding to the image signal to the color-specific light valves 53R, 53G, 53B on a row-by-row basis so that the area 71 starting with the top pixel row spreads to the bottom pixel row. The image A is formed in the timing A1 and the timing A2, that is, the same image A is formed twice during one vertical period. Accordingly, mixing phenomena of the image A and the image B due to time required of the boundary 73 to move from the top pixel row to the bottom pixel row can be eased.

Figure 8C:
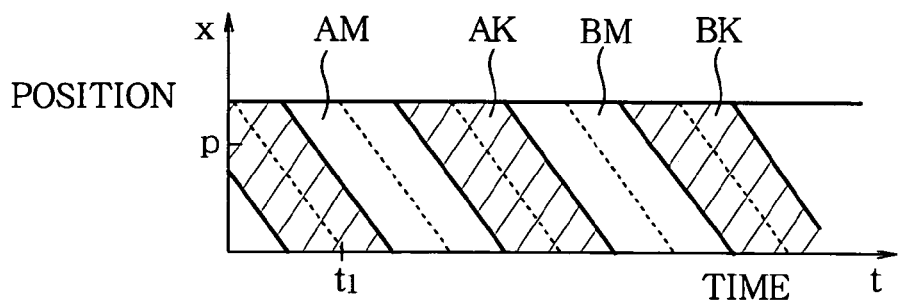
FIG. 8*c* shows timings AM, BM in each of which an image is formed on the image forming plane of the first light valve 47 and shows timings AK, BK in each of which all the pixels on the image forming plane of the first light valve 47 are set to black level to display a full screen black pattern.

In FIG. 8c, AM represents timing in which light modulation based on the coefficient M is performed for forming the image A, BM represents timing in which light modulation based on the coefficient M is performed for forming the image B, and AK and BK represent timings in which all the pixels are set in OFF state to display a full screen black pattern.

Figure 8D:
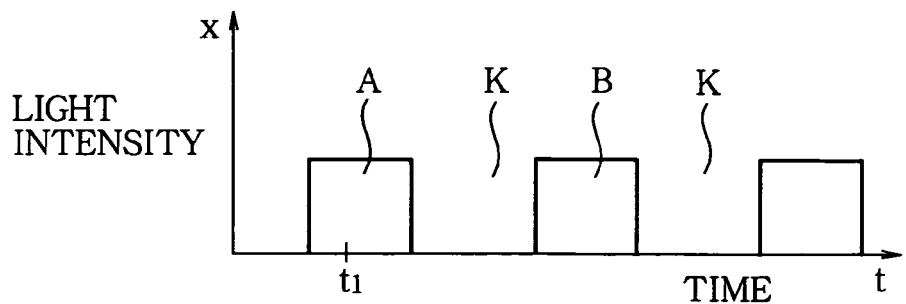
FIG. 8*d* shows intensity of light emitted from a pixel at a point p on the image forming plane.

In FIG. 8d, the horizontal axis represents time and the vertical axis represents intensity of light emitted from the pixel at the point p. As shown in this figure, the period K during which the first light valve 47 displays the full screen black pattern is interposed between the period during which the image A is formed and the period during which the image B is formed. That is, the images A and B are projected in the so-called impulse-drive mode, so that image quality in projecting moving pictures can be improved.

Bringing the first light valve 47 to the OFF state in the timing AK and the timing BK causes the light L21B reflected from the first light valve 47 to increases on average. However, providing the timing AK and the timing BK does not reduce brightness of the projected image much, since the light L21B is reflected by the reflecting mirror 42 and added to the illuminating light L21 again as explained above. Furthermore, since the area 71 is irradiated by the light L21B which reflected off the area 72, intensity of the image light output from the display apparatus increases. By reusing the light L21B, or by mixing the illuminating light with the light L21B reflected from the first light valve 47 in the columnar optical device 4, it becomes possible to illuminate the first light valve 47 uniformly throughout its light-entrance surface.

The extent of increase in brightness achieved by reusing the reflected light depends on optical characteristics of devices used. Here, it is assumed that the intensity of the illuminating light L21 is I when the reflected light is not reused, and IS when the reflected light is reused, the average rate of occurrence of the light L21B on the light-entrance surface of the first light valve 47 is RT1, and the average reflectivity of the reflecting mirror is RT2. Since the light which is reflected by the first light valve 47 and moves back is reflected by the reflecting mirror 42 twice before it is reflected by the first light valve 47 again, the intensity IS can be expressed as a sum of the infinite geometric series whose first term is I and whose common ratio is RT1×RT2×RT2 except losses of other optical devices from consideration. That is, IS=I/(1−RT1×RT2×RT2). If RT1 is 0.5 and RT2 is 0.9, IS=1.68×I.

Conventionally, when the first light valve 47 operates in the impulse-drive mode with duty ratio of 0.5, the brightness reduce to 50% of that when it operates in the normal continuous mode in projecting a 100% full screen white pattern. Whereas, in this embodiment, since the intensity of the illuminating light increases 1.68 times, the brightness when the first light valve 47 operates in the impulse-drive mode is increased to 50%×1.68=84%. The intensity of the light reflected by the first light valve 47 and moves in the reverse direction further increases when projecting images different from the 100% full screen white pattern. For example, when RT1=0.6, the brightness of the image projected in the impulse-drive mode is further improved, since IS increases to 1.94×I. It is desirable to determine the duty ratio of the first light valve 47 in the impulse-drive mode in consideration of optical characteristics of devices used, required extent of improvement in image quality in projecting moving pictures and required brightness of projected images.

Although the first light valve 47 is a reflective liquid-crystal light valve in Embodiment 3 described above, it may be a micro mirror device. In this case, the quarter wave plate 43 and the reflective polarization-separation device 44 can be eliminated. Furthermore, although the color-specific light valves 53R, 53G, 53B are illuminated with no illuminating light during the period K in Embodiment 3, it is permissible to illuminate them with lights during the period K having intensity between ⅛ and 1/16 of that of the lights with which they are illuminated during the periods A and B shown in FIG. 8d. By illuminating the color-specific light valves 53R, 53G, 53B with such weak lights during the period K, halftone reproduction of a dark part of a projected image can be improved. This improvement is equivalent to the effect obtained by increasing the number of bits constituting an image signal by three or four.

As described above, with Embodiment 3 of the invention, it is possible to provide a projection-type display apparatus having high utilization efficiency of light and being capable of displaying brighter images at low cost.

Embodiment 4.

Figure 9:
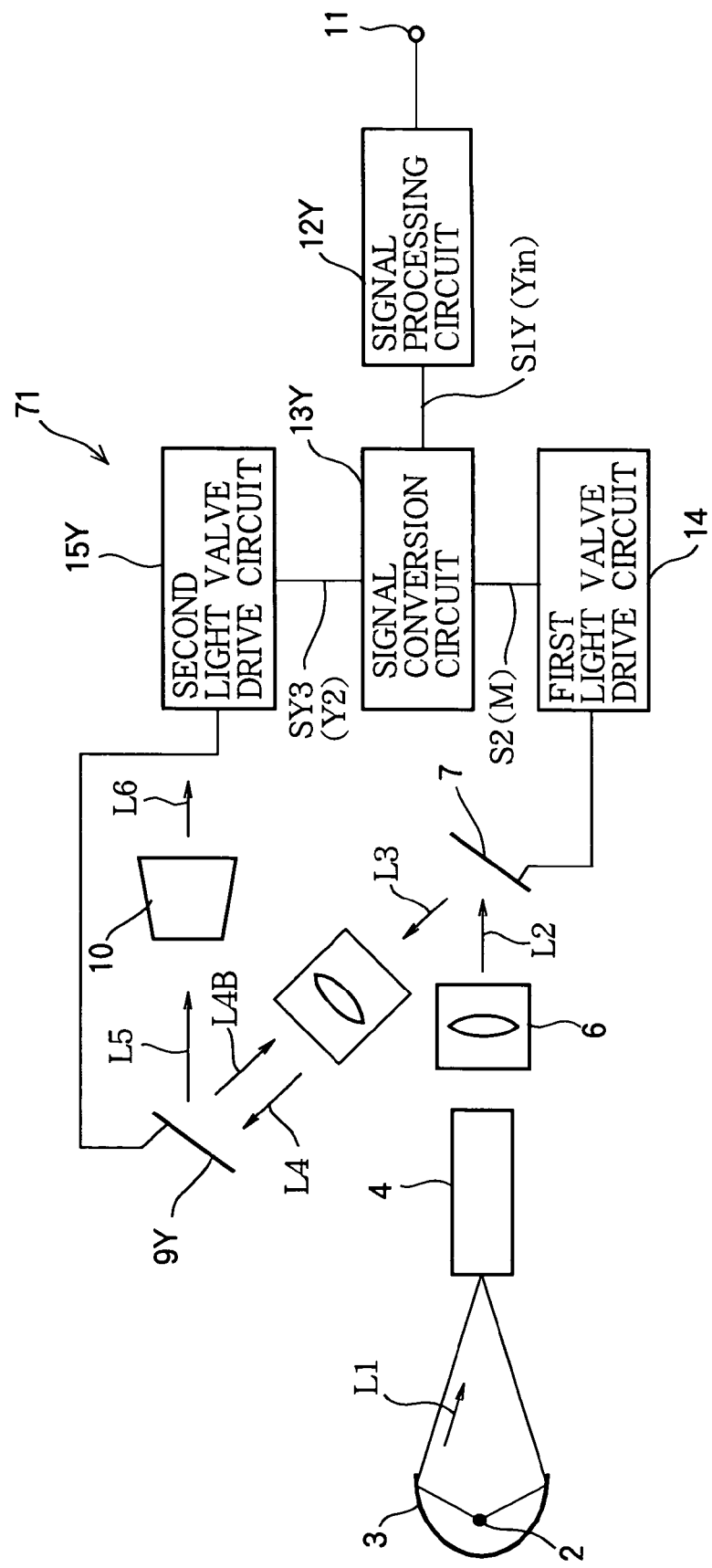
FIG. 9 shows a structure of a projection-type display apparatus 71 according to Embodiment 4 of the invention.

FIG. 9 shows a structure of a projection-type display apparatus 71 according to Embodiment 4 of the invention. In FIG. 9 and FIG. 1, identical reference characters are used for identical elements. The elements given reference characters having a suffix "Y" in FIG. 9 are different from their equivalents shown in FIG. 1 in structure or operation. In FIG. 9, the signal processing circuit 12Y produces, from an image signal input through the signal receiving section 11, a first image signal S1Y representing a luminance Yin whose value is normalized and gamma-corrected in compensation for the gamma characteristic of TV receivers in which brightness of an image displayed is proportional to 2.2nd power of magnitude or level of an input video signal, and supplies it to the signal conversion circuit 13Y. The signal conversion circuit 13Y performs reverse gamma conversion on the first image signal S1Y which is an NTSC TV signal, and produces the second image signal S2 representing the coefficient M and the third image signal S3Y representing a second luminance Y2.

The reverse gamma conversion may be performed by use of a reference table, for example. In a case where the level of a supplied drive signal and the intensity of output light are not in a linear relation in the first and second light valves 7, 9Y, the reference table is modified so that non-linearity correction is carried out simultaneously with the reverse gamma conversion.

If the first light valve 7 and the second light valve 9Y have the same modulation characteristic, the coefficient M and the second luminance Y2 may be identical. In this case, the coefficient M and the second luminance Y2 are determined by the equations of $M=Y2=(Yin2.2)^{1/2}$ by use of the reference table prepared for this specific case. When the first light valve 7 and the second light valve 9Y have different modulation characteristics, it is desirable that the light valve having less leakage light has a larger contributing ratio than the other light valve having more leakage light in modulating the input light.

So, in this case, the coefficient M and the second luminance Y2 are determined by the equations of $M=(Yin^{2.2})^{1/2+\alpha}$, $Y2=(Yin^{2.2})^{1/2-\alpha}$, where $\alpha$ is a parameter variable between −½ and ½ instead of the equations of $M=Y2=(Yin^{2.2})^{1/2}$. For example, if the parameter a is set to +0.2, the importance of the coefficient M is increased, whereby the contributing ratio of the first light valve 7 using the coefficient M as a modulation factor is increased. Since the relationship of $M \times Y2=Yin^{2.2}$ holds for any value of the parameter $\alpha$, halftone reproduction can be done correctly irrespective of variation of the parameter $\alpha$.

Figure 10:
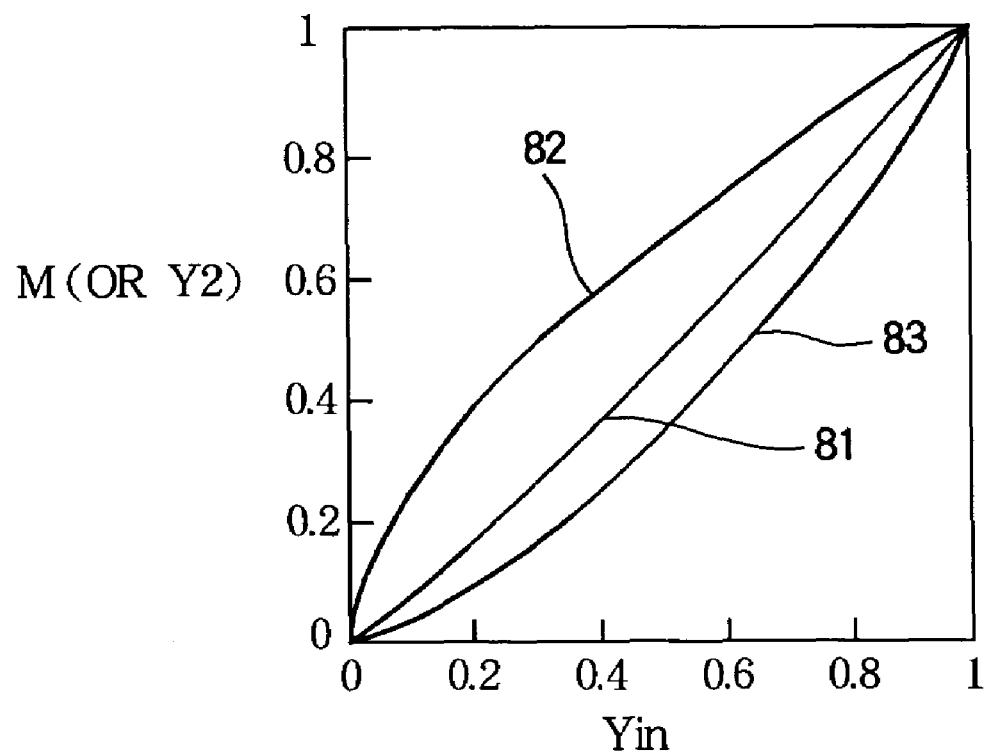
FIG. 10 is a graph contained in a reference table which a signal conversion circuit 13Y of the projection-type display apparatus 71 uses for signal conversion on input image signal.

FIG. 10 shows a graph equivalent to the reference table which the signal conversion circuit 13Y uses. The horizontal axis represents the luminance Yin, and the vertical axis represents the coefficient M or the second luminance Y2. The curves 81, 82, 83 represent conversion characteristics when the parameter a takes the value of 0, −0.2, and +0.2 respectively. When it is required that the coefficient M and the second luminance Y2 have the same contributing ratio, they are produced based on the curve 81. When it is required that the coefficient M has a larger contributing ratio, the coefficient M is produced based on the curve 83 whose inclination near its top is sharper than the curve 81, and the second luminance Y2 is produced based on the curve 82. In either case, the product of the coefficient M and the second luminance Y2 equals to the 2.2nd power of the luminance Yin, so that the image can be projected with halftone correctly reproduced. However, if the input image signal is not in conformity with the NTSC standard in which the gamma is 2.2, but is in conformity with other standards such as HDTV, the signal conversion circuit 13 has to produce the coefficient M and the second luminance Y2 in accordance with standard-specific gamma value.

When the first light valve 7 and the second light valve 9Y are reflective light valves, the light L4B not to be thrown onto the screen may be reflected between the first light valve 7 and the second light valve 9Y repeatedly.

Figure 11:
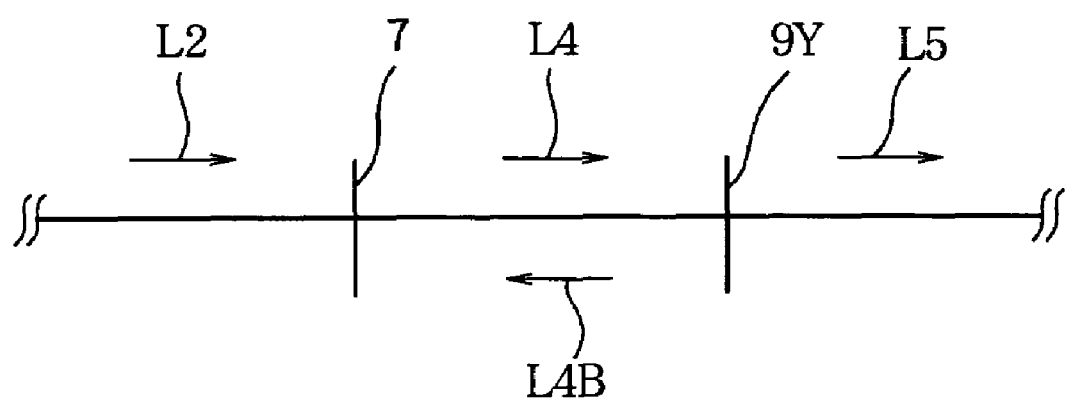
FIG. 11 schematically shows lights entering and exiting from the first light valve 7 and the second light valve 9Y within the projection-type display apparatus 71.

FIG. 11 schematically shows lights entering and exiting from the first light valve 7 and the second light-valve 9Y. The light that has entered the first light valve 7 is modulated based on the coefficient M to become the light L4. The light L4 enters the second light valve 9Y and is modulated there based on the second luminance Y2 to become the light L5. Some of the light L4 is reflected by the second light valve 9Y to become the light L4B moving toward the first light valve 7. Some of the light L4B that has entered the first light valve 7 is reflected there to be added to the light L4 moving toward the second light valve 9Y.

It can be thought that $(1-Y2) \times 100\%$ of the light L4 is reflected by the second light valve 9Y to become the light L4B, and $(1-M) \times 100\%$ of the light L4B is added to the light L4 in the first light valve 7. Accordingly, the intensity of the light L5 can be determined as a sum L5s of an infinite geometric series whose first term is L5=L2×M×Y2 and whose common ratio is $(1-Y2) \times (1-M)$. The sum L5s of this infinite geometric series equals to $L5/(1-(1-Y2) \times (1-M))$. When Yin=0.1 and M=Y2 =0.079, L5S/L5=$1/(1-(1-Y2) \times (1-M))$=6.58. From this expression, it turns out that the brightness of a dark part of a projected image becomes several times higher than the correct brightness, if the light L4B not to be thrown onto the screen is reflected between the first light valve 7 and the second light valve 9Y repeatedly.

Such brightness level deviation in the dark part of the projected image can be compensated by modifying the reference table which the signal conversion circuit 12Y uses as explained below.

For example, in a case where Y2=M, $L5S=L2 \times M^2/(1-(1-M)^2)$, it is necessary to modify the reference table so that the value of $L5S/L2=M^2/(1-(1-M)^2)$ is determined to be equal to the 2.2nd power of the luminance Yin to compensate for the brightness level deviation. From the equation of $M^2/(1-(1-M)^2)=Yin^{2.2}$, the coefficient M can be determined as $2 \times Yin^{2.2}/(1+Yin^{2.2})$.

Figure 12A:
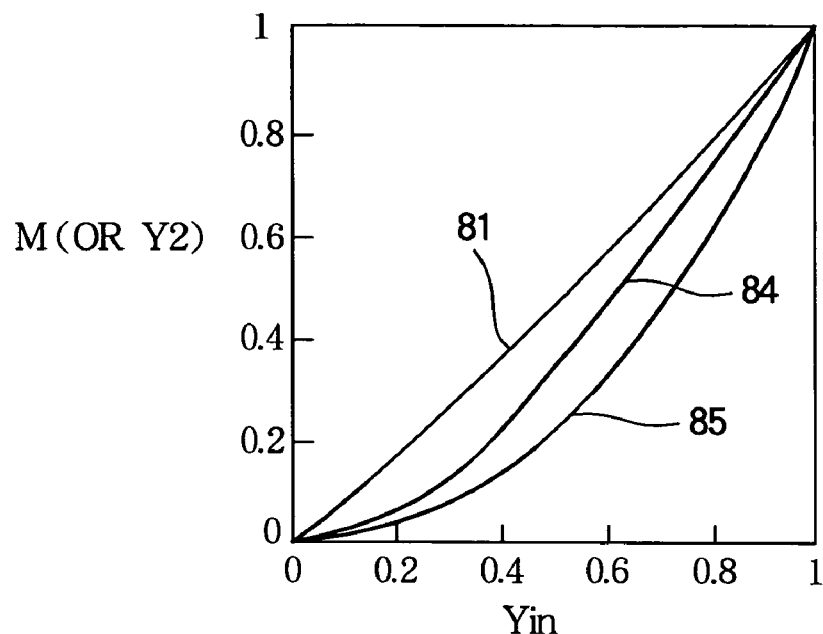
FIGS. 12*a* and 12*b* are graphs representing relationship between luminance Yin included in an input image signal and a coefficient M (or a second luminance Y2) represented by a second image signal to be supplied to the first light valve 7 (or the second light valve 9Y).

A curve 84 in FIG. 12*a* represents relationship between the luminance Yin represented by the input image signal and the coefficient M determined as explained above. As a result of producing the coefficient M in accordance with the curve 84, L5S representing the intensity of the light L5 becomes equal to the intensity of the light L2 multiplied by the 2.2nd power of Yin as represented by a curve 85 in FIG. 12*a*.

Figure 12B:
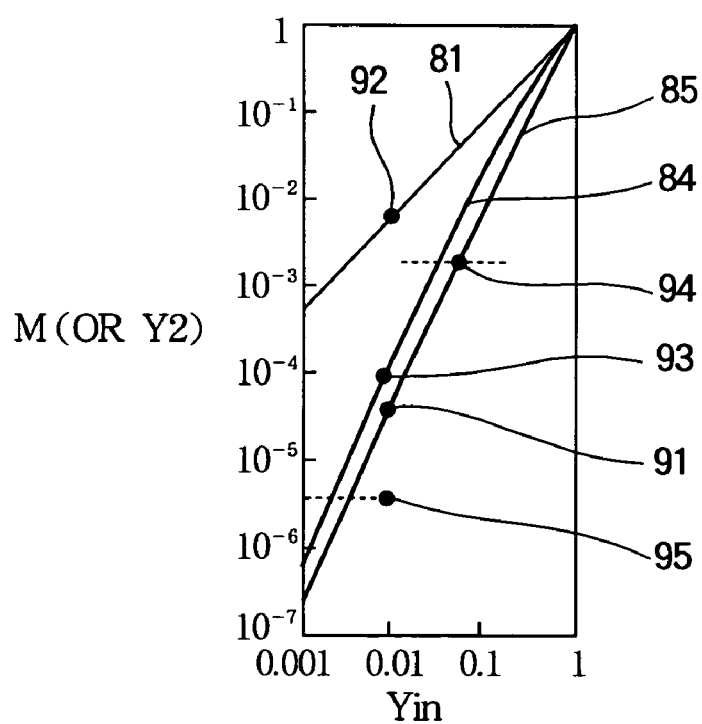

A logarithmic graph show in FIG. 12*b* having horizontal and vertical log scales is equivalent to the graph shown in FIG. 12*a*. For example, when the luminance Yin is 0.01, the image light thrown onto the screen must have intensity level which is $(0.01)^{2.2}=3.9 \times 10^{-5}$. In FIG. 12*b*, this level is shown by a point 91. When a single light valve is used, this single light valve modulates input light to output light having intensity level shown by the point 91. In a case where two light valves are used as is the case with this embodiment, each of the light valves modulates input light to output light having intensity level shown by a point 92 which is above the point 91 if there is no light reflected repeatedly between the two light valves, or modulates input light to output light having intensity level shown by a point 93 which is slightly above the point 91 if there is light reflected repeatedly between the two light valves.

Previously, it was impossible to correctly reproduce halftone of an image whose luminance level is below a point 94 in FIG. 12*b* if more than 1/500 of input light leaks. With this embodiment having the structure in which illuminating light passes through two light valves, since only $(1/500)^2=4 \times 10^{-6}$ of input light leaks, and accordingly the level of leakage light lowers to a point 95 in FIG. 12*b*, image contrast can be improved. Furthermore, as a result of image contrast improvement, it becomes possible to use light valves whose dynamic range is narrower than that of previously used ones when the coefficient M is to be produced based on the curve 81, and to use light valves whose dynamic range is about the same as that of previously used ones when the coefficient M is to be produce based on the curve 84.

Incidentally, the utilization efficiency of light of the reflective light valve is not 100%, and about 30% of input light is lost due to interpixel invalid areas, light diffraction, reflection loss, etc. Accordingly, the effect of the light reflection repeated between the two light valves becomes small. Furthermore, since image contrast can be increased by use of two light valves, the utilization efficiency of light of the light source can be increased as well by using light within a wider angle range than ever before.

Although Embodiment 4 of the invention is a monochromatic display apparatus, it is possible for the projection-type display apparatus according to Embodiment 4 to operate as a full color display apparatus by replacing at least one of the second luminance Y2 and the coefficient M with the second primary-color information R2, G2, B2. In this case, the second primary-color information R2, G2, B2 is determined to satisfy the relation Y2=0.3×R2+0.59×G2+0.11×B2, for example.

As explained above, even when the first light valve 7 and the second light valve 9Y have different modulation characteristics, for example, even when they have different leakage current levels, it is possible to reproduce halftone faithfully to an input image by making the light valve with less leakage light have a larger contributing ratio than the other light valve with more leakage light in modulating the input light.

The above explained preferred embodiments are exemplary of the invention of the present application which is described solely by the claims appended below. It should be understood that modifications of the preferred embodiments may be made as would occur to one of skill in the art.

What is claimed is:

1. A projection display apparatus for projecting an image onto a screen, comprising:
    a light source;
    a signal processing unit for processing an input image signal to output a first image signal representing first primary-color information R1, G1, and B1 representing values of red, green, and blue components of an image to be projected;
    a signal conversion unit for converting the first image signal into a second image signal representing a coefficient M which depends on luminance of the image to be projected defined by the first primary-color information R1, G1, and B1, and into a third image signal representing second primary-color information R2 =R1/M, G2 =G1/M, and B2=B1/M;
    a first light valve for modulating light received from the light source in accordance with the coefficient M, the light changing in color among red, green, and blue in sequence;
    a second light valve for further modulating the light received from the first light valve in accordance with the second primary-color information R2, G2, and B2 in sequence; and a projection unit for throwing the light received from the second light valve onto the screen.

2. A projection display apparatus according to claim 1, in which values of the first primary-color information R1, G1, and B1, the second primary-color information R2, G2, and B2 and the coefficient M are normalized to be between 0 and 1, the signal conversion unit produces temporal parameters $Y=0.3\times R1+0.59\times G1 +0.11\times B1$, $Mt=Y^{1/2}$, $Rt=R1/Mt$, $Gt=G1/Mt$, $Bt=B1/Mt$, $Mtt = \max(Rt, Gt, Bt)$, and determines a value of the coefficient M to be 1 if $Mtt>1$, or to be a value of Mtt if not $Mtt>1$.

3. A projection display apparatus according to claim 1, in which the signal conversion unit determines the values of the coefficient M and the second primary-color information R2, G2, and B2 in order that one of the first and second light valves that has less leakage light than the other has a larger contributing ratio than the other in modulating the light received from the light source.

4. A projection display apparatus according to claim 1, in which the number of pixels of the second light valve is larger than that of the first light valve.

5. A projection display apparatus according to claim 4, in which the first and second light valves are disposed in a conjugate relation, and a shape of the pixels of the first light valve is different from a shape of the pixels of the second light valve.

6. A projection display apparatus according to claim 1, in which at least one of the first and second light valves is a reflective light valve.

7. A projection display apparatus according to claim 1, in which the light source is provided with a color-switching unit that receives white light and outputs the light changing in color among red, green and blue in sequence.

8. A projection display apparatus according to claim 1, further comprising a sync-separation unit for separating a vertical sync signal from the input image signal, the first light valve performing light modulation in accordance with the coefficient M on a pixel-by-pixel basis in synchronization with the vertical sync signal.

9. A projection display apparatus for projecting an image onto a screen, comprising:
a light source;
a signal processing unit for processing an input image signal to output a first image signal representing first primary-color information R1, G1, and B1 representing values of red, green, and blue components of an image to be projected;
a signal conversion unit for converting the first image signal into a second image signal representing a coefficient M which depends on luminance of the image to be projected defined by the first primary-color information R1, G1, and B1, and into a third image signal representing second primary-color information $R2=R1/M$, $G2=G1/M$, and $B2=B1/M$;
a first light valve for modulating light received from the light source in accordance with the coefficient M;
a color-separation unit for separating the light modulated by the first light valve into red, green and blue lights;
three second light valves for further modulating the red, green and blue lights received from the color separation unit in accordance wit the second primary-color information R2, G2, and B2 respectively; and
a projection unit for throwing mixture of the red, green, and blue lights modulated by the three second light valves onto the screen.

10. A projection display apparatus according to claim 9, in which a light recycling unit is disposed between the light source and the first light valve for adding light reflected by the first light valve and moves back to light source to the light emitted from the light source and moves toward the first light valve.

11. A projection display apparatus for projecting an image onto a screen, comprising:
a light source;
a signal processing unit for processing an input image signal to produce a first image signal representing first luminance information Y1 representing luminance of an image to be projected;
a signal conversion unit for converting the first image signal into a second image signal representing a coefficient $M=Y1^{1/2+\alpha}$, $\alpha$ being a parameter variable between $-\frac{1}{2}$ and $+\frac{1}{2}$, and into a third image signal representing second luminance information $Y2=Y^{1/2+\alpha}$
a first light valve for modulating light received from the light source in accordance with the coefficient M represented by the second image signal;
a second light valve for further modulating the light received from the first light valve in accordance with the second luminance information Y2 represented by the third image signal; and
a projection unit for throwing the light received from the second light valve onto the screen.

12. A method of driving a projection display apparatus having a light source, a first light valve modulating light received from the light source in accordance with a first drive signal, the light changing in color among red, green and blue, a second light valve further modulating the light received from the first light valve in accordance with a second drive signal, and a projection unit throwing the light received from the second light valve onto a screen, comprising the steps of: producing, from an input image signal, first primary-color information R1, G1, and B1 representing values of red, green and blue components of an image to be projected;
producing a coefficient M which depends on luminance of the image to be projected defined by the first primary-color information R1, G1, and B1;
producing second primary-color information $R2=R1/M$, $G2=G1/M$, and $B2=B1/M$;
supplying the first light valve with the coefficient M as the first drive signal; and
supplying the second light valve with the second-primary color information R2, G2, and B2 as the second drive signal.

13. A method of driving a projection display apparatus having a light source, a first light valve modulating light received from the light source in accordance with a first drive signal, a light-separation unit separating the light modulated by the first light valve into red, green and blue lights, three second light valves further modulating the red, green and blue lights received from the color separation unit in accordance with second drive signals, and a projection unit throwing mixture of the red, green, and blue lights modulated by the three second light valves onto a screen; comprising the steps of:
producing, from an input image signal, first primary-color information R1, G1, and B1 representing values of red, green, and blue components of an image to be projected;
producing a coefficient M which depends on luminance of the image to be projected defined by the first primary-color information R1, G1, and B1;
producing second primary-color information $R2=R1/M$, $G2=G1/M$, and $B2=B1/M$;

supplying the first light valve with the coefficient M as the first drive signal; and supplying the three second light valves with the second-primary color information R2, G2, and B2 as the second drive signals.

14. A method of driving a projection display apparatus having a light source, a first light valve modulating light received from the light source in accordance with a first drive signal, a second light valve further modulating the light received from the first light valve in accordance with a second drive signal, and a projection unit for throwing the light received from the second light valve onto a screen, comprising the steps of:

producing first luminance information Y1 representing luminance of an image to be projected from an input image signal;

producing a coefficient $M=Y1^{1/2+\alpha}$, $\alpha$ being a parameter variable between $-\frac{1}{2}$ and $+\frac{1}{2}$;

producing second luminance information $Y2=Y1^{1/2-\alpha}$;

supplying the first light valve with the coefficient M as the first drive signal; and supplying the second light valve with the second luminance information Y2 as the second drive signal.

15. A device for driving a projection display apparatus having a light source, a first light valve modulating light received from the light source in accordance with a first drive signal, a second light valve further modulating the light received from the first light valve in accordance with a second drive signal, and a projection unit for throwing the light received from the second light valve onto a screen, said device comprising:

a signal processing unit for producing, from an input image signal, first primary-color information R1, G1, and B1 representing values of red, green and blue components of an image to be projected;

a signal conversion unit for producing a coefficient M which depends on luminance of the image to be projected defined by the first primary-color information R1, G1, and B1, and producing second primary-color information R2=R1/M, G2=G1/M, and B2=B1/M;

a first light valve circuit for supplying the first light valve with the coefficient M as the first drive signal; and a second light valve circuit for supplying the second light valve with the second-primary color information R2, G2, and B2 as the second drive signal.

16. A device for driving a projection display apparatus having a light source, a first light valve modulating light received from the light source in accordance with a first drive signal, a second light valve further modulating the light received from the first light valve in accordance with a second drive signal, and a projection unit for throwing the light received from the second light valve onto a screen, said device comprising:

a signal processing unit for calculating first luminance information Y1 representing luminance of an image to be projected from an input image signal;

a signal conversion unit for producing a coefficient $M=Y1^{1/2+\alpha}$, $\alpha$ being a parameter variable between $-\frac{1}{2}$ and $+\frac{1}{2}$, and second luminance information $Y2=Y1^{1/2+\alpha}$ a first light valve circuit for supplying the first light valve with the coefficient M as the first drive signal; and a second light valve circuit for supplying the second light valve with the second luminance information Y2 as the second drive signal.

* * * * *